(12) United States Patent
Cao et al.

(10) Patent No.: US 12,245,122 B2
(45) Date of Patent: Mar. 4, 2025

(54) BIKE LANE COMMUNICATIONS NETWORK

(71) Applicant: Qualcomm Incorporated, San Diego, CA (US)

(72) Inventors: Yiqing Cao, Beijing (CN); Jing Lei, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/616,767

(22) PCT Filed: Jun. 2, 2020

(86) PCT No.: PCT/CN2020/093877
§ 371 (c)(1),
(2) Date: Dec. 6, 2021

(87) PCT Pub. No.: WO2020/248869
PCT Pub. Date: Dec. 17, 2020

(65) Prior Publication Data
US 2022/0312169 A1    Sep. 29, 2022

(30) Foreign Application Priority Data

Jun. 13, 2019   (WO) ................ PCT/CN2019/091038

(51) Int. Cl.
*H04W 4/90* (2018.01)
*H04W 4/02* (2018.01)
(Continued)

(52) U.S. Cl.
CPC ............. *H04W 4/90* (2018.02); *H04W 4/024* (2018.02); *H04W 4/027* (2013.01);
(Continued)

(58) Field of Classification Search
CPC ....... H04W 4/024; H04W 4/027; H04W 4/90; H04W 36/0058; H04W 36/32
(Continued)

(56) References Cited

U.S. PATENT DOCUMENTS 10,251,018 B1\*   4/2019  Susel ..................... G06N 20/00
2016/0095092 A1   3/2016  Khoryaev et al.
(Continued)

FOREIGN PATENT DOCUMENTS

CN          102457938 A      5/2012
CN          103444210 A      12/2013
(Continued)

OTHER PUBLICATIONS

International Search Report and Written Opinion—PCT/CN2020/093877—ISA/EPO—Sep. 3, 2020.
(Continued)

*Primary Examiner* — Joel Ajayi
(74) *Attorney, Agent, or Firm* — Holland & Hart LLP

(57) ABSTRACT

Methods, systems, and devices for wireless communications are described. A wireless device may communicate with multiple beacon devices (e.g., road side beacons), where messages from the road side beacons may be transmitted over a sidelink communications link and may be used to determine a speed and/or location of the wireless device. In some examples, the messages may carry public safety information, location information, navigation information, or other types of information, which may be used, for example, to notify the wireless device of a nearby event, to enable navigation, or the like. When receiving messages from the road side beacons, the wireless device may report a status to a base station, which may determine a relationship between transmissions from the wireless device and predict future transmissions based on the relationship. As a result, the base (Continued)

station may modify communications parameters in accordance with the status of the wireless device.

30 Claims, 22 Drawing Sheets

(51) Int. Cl.
  *H04W 4/024* (2018.01)
  *H04W 36/00* (2009.01)
  *H04W 36/32* (2009.01)
(52) U.S. Cl.
  CPC ..... *H04W 36/0058* (2018.08); *H04W 36/322* (2023.05); *H04W 36/324* (2023.05)
(58) Field of Classification Search
  USPC ...................................................... 455/404.1
  See application file for complete search history.

(56) References Cited

U.S. PATENT DOCUMENTS

| | | | | |
|---|---|---|---|---|
| 2017/0289733 | A1* | 10/2017 | Rajagopal | H04L 5/0082 |
| 2017/0339530 | A1* | 11/2017 | Maaref | H04L 5/0055 |
| 2018/0083722 | A1 | 3/2018 | Reial et al. | |
| 2018/0146387 | A1* | 5/2018 | Hong | H04W 4/023 |
| 2018/0255552 | A1* | 9/2018 | Luo | H04B 10/2575 |
| 2019/0007846 | A1* | 1/2019 | Lee | H04W 4/02 |
| 2019/0325750 | A1* | 10/2019 | Bielby | G08G 1/162 |
| 2019/0331503 | A1* | 10/2019 | Yoneda | G01C 21/3492 |
| 2021/0360626 | A1 | 11/2021 | Gong | |

FOREIGN PATENT DOCUMENTS

| | | |
|---|---|---|
| CN | 105280005 A | 1/2016 |
| CN | 108337660 A | 7/2018 |
| CN | 108886414 A | 11/2018 |
| CN | 109842934 A | 6/2019 |
| EP | 3264806 A1 | 1/2018 |
| KR | 20120138612 A | 12/2012 |
| WO | WO-2016142972 A1 | 9/2016 |
| WO | WO-2017167372 A1 | 10/2017 |

OTHER PUBLICATIONS

International Search Report and Written Opinion—PCT/CN2019/091038—ISA/EPO—Mar. 13, 2020.
Supplementary Partial European Search Report—EP20822575—Search Authority—The Hague—Jun. 12, 2023.
Supplementary European Search Report—EP20822575—Search Authority—The Hague—Sep. 12, 2023.

* cited by examiner

BIKE LANE COMMUNICATIONS NETWORK

CROSS REFERENCE TO RELATED APPLICATIONS

The present application is a 371 national stage filing of International PCT Application No. PCT/CN2020/093877 by Cao et al., entitled "BIKE LANE COMMUNICATIONS NETWORK," filed Jun. 2, 2020; and claims priority to International PCT Application No. PCT/CN2019/091038 by Cao et al., entitled "BIKE LANE COMMUNICATIONS NETWORK," filed Jun. 13, 2019, each of which is assigned to the assignee hereof, and each of which is expressly incorporated by reference in its entirety herein.

FIELD OF TECHNOLOGY

The following relates generally to wireless communications, and more specifically to bike lane communications networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Cycling may generally be an inexpensive means of transportation, and bicycles may accordingly be used for commuting, recreation, touring, and sport worldwide. In some cases, there may also be designated cycling locations (such as bike lanes) where cyclists may carry UEs while riding within the coverage of a wireless communications system.

SUMMARY

The described techniques relate to improved methods, systems, devices, and apparatuses that support bike lane communications networks. Generally, the described techniques may provide for identification and tracking of bicycles through communications between wireless devices. As an example, a set of beacon devices (e.g., road side beacons) may be established for a bike lane, where the beacon devices may transmit messages to an on board module of a bicycle (e.g., a wireless device that is part of or attached to the bicycle), to a user equipment (UE) carried by a cyclist, or both. In some cases, the communications between the beacon devices and the on board modules and/or UEs may be transmitted over a sidelink communications link. The messages transmitted by the beacon devices may be used to determine the speed of the bike (e.g., to ensure speed limits of a bike lane are being followed), determine the location of the bike (e.g., for navigation purposes), ensure appropriate types of bicycles are using the bike lane (e.g., where motorized or electric bikes may be prohibited on a bike lane), or the like. Additionally or alternatively, the messages transmitted by the beacon devices may be used for emergency or public safety purposes to alert cyclists of various events or issues. Here, the beacon devices may transmit messages that indicate public safety information to the on board module and/or UE, which may alert a cyclist to an event (e.g., an accident, a lane closure, etc.) or public safety incidents (natural disasters, fire alarms, etc.) so that the cyclist may timely and efficiently avoid the affected location.

The described techniques may further provide for the enhancement of wireless communications and mobility of UEs carried by cyclists. As an example, a cyclist's UE may generally have a constant speed and direction, and channel measurement techniques may accordingly be enhanced based on the mobility of the UE. In some cases, upon receiving consecutive messages from beacon devices (e.g., associated with a bike lane), a UE may provide an indication to a base station of a mobility status (e.g., a "cyclist" status). The base station may determine an association between consecutive transmissions from the UE (e.g., consecutive measurement reports), and may use the UE's status and the association to estimate future measurement reports and measurement results. In such cases, the base station may improve communications based on the UE's mobility and may, for example, perform techniques to improve handover efficiency (e.g., initiating an early handover or otherwise adjusting handover parameters to reduce handover latency).

A method of wireless communication at a wireless device is described. The method may include identifying a set of beacon devices, receiving, over a sidelink communications link, one or more messages from each beacon device of the set of beacon devices, and determining a mobility state of the wireless device based on the received one or more messages, the mobility state including a location of the wireless device, a speed of the wireless device, or a combination thereof.

An apparatus for wireless communication at a wireless device is described. The apparatus may include a processor, memory coupled with the processor, and instructions stored in the memory. The instructions may be executable by the processor to cause the apparatus to identify a set of beacon devices, receive, over a sidelink communications link, one or more messages from each beacon device of the set of beacon devices, and determine a mobility state of the wireless device based on the received one or more messages, the mobility state including a location of the wireless device, a speed of the wireless device, or a combination thereof.

Another apparatus for wireless communication at a wireless device is described. The apparatus may include means for identifying a set of beacon devices, receiving, over a sidelink communications link, one or more messages from each beacon device of the set of beacon devices, and determining a mobility state of the wireless device based on the received one or more messages, the mobility state including a location of the wireless device, a speed of the wireless device, or a combination thereof.

A non-transitory computer-readable medium storing code for wireless communication at a wireless device is described. The code may include instructions executable by a processor to identify a set of beacon devices, receive, over a sidelink communications link, one or more messages from each beacon device of the set of beacon devices, and determine a mobility state of the wireless device based on the received one or more messages, the mobility state including a location of the wireless device, a speed of the wireless device, or a combination thereof.

Some examples of the method, apparatuses, and non-transitory computer-readable medium described herein may further include operations, features, means, or instructions for receiving a beacon device identifier within each of the one or more messages, where the mobility state may be determined based on the beacon device identifier of the one or more messages.

In some examples of the method, apparatuses, and non-transitory computer-readable medium described herein, each beacon device identifier corresponds to a respective beacon device of the set of beacon devices that transmitted a message of the one or more messages.

Some examples of the method, apparatuses, and non-transitory computer-readable medium described herein may further include operations, features, means, or instructions for receiving public safety information within a payload of a first message of the one or more messages, and identifying a public safety warning type indicated by the public safety information.

Some examples of the method, apparatuses, and non-transitory computer-readable medium described herein may further include operations, features, means, or instructions for prioritizing the first message over other messages received at the wireless device based on the public safety information within the payload of the first message.

In some examples of the method, apparatuses, and non-transitory computer-readable medium described herein, prioritizing the first message may include operations, features, means, or instructions for refraining from transmitting to other wireless devices based on the public safety information, and discarding a set of messages received by the wireless device.

Some examples of the method, apparatuses, and non-transitory computer-readable medium described herein may further include operations, features, means, or instructions for receiving a second message from a second wireless device, a payload of the second message including public safety information, navigation information, hazard information, or a combination thereof, and transmitting a third message to one or more other wireless devices based on the received one or more messages, the received second message, or a combination thereof.

In some examples of the method, apparatuses, and non-transitory computer-readable medium described herein, transmitting the third message may include operations, features, means, or instructions for transmitting the third message using a first set of time and frequency resources, a payload of the third message including an indication of the public safety information.

In some examples of the method, apparatuses, and non-transitory computer-readable medium described herein, transmitting the third message may include operations, features, means, or instructions for transmitting the third message using a second set of time and frequency resources, a payload of the third message including an indication of the navigation information, the hazard information, or a combination thereof.

In some examples of the method, apparatuses, and non-transitory computer-readable medium described herein, a payload of the third message includes an indication of the public safety information, the navigation information, the hazard information, location information, or a combination thereof.

Some examples of the method, apparatuses, and non-transitory computer-readable medium described herein may further include operations, features, means, or instructions for receiving an indication of an emergency event, and communicating with one or more temporary nodes based on the received indication. In some examples of the method, apparatuses, and non-transitory computer-readable medium described herein, the one or more temporary nodes form a mobile hotspot, a mesh network, or any combination thereof.

Some examples of the method, apparatuses, and non-transitory computer-readable medium described herein may further include operations, features, means, or instructions for determining a mobility status of the wireless device based on the received one or more messages, and transmitting, to a base station, an indication of the mobility status.

In some examples of the method, apparatuses, and non-transitory computer-readable medium described herein, the mobility status includes a cyclist status.

In some examples of the method, apparatuses, and non-transitory computer-readable medium described herein, receiving the one or more messages may include operations, features, means, or instructions for receiving the one or more messages via an unlicensed radio frequency spectrum band over the sidelink communications link.

In some examples of the method, apparatuses, and non-transitory computer-readable medium described herein, receiving the one or more messages may include operations, features, means, or instructions for receiving the one or more messages via a licensed radio frequency spectrum band over the sidelink communications link, where each of the one or more messages may be received on a set of configured resources, a set of predefined resources, or a combination thereof.

In some examples of the method, apparatuses, and non-transitory computer-readable medium described herein, the wireless device includes a user equipment, an onboard module of a bicycle, or any combination thereof. In some examples of the method, apparatuses, and non-transitory computer-readable medium described herein, each beacon device of the set of beacon devices include a roadside beacon for a bike lane.

A method of wireless communication at a wireless device is described. The method may include determining an identifier corresponding to the wireless device, identifying one or more other wireless devices, and transmitting, over a sidelink communications link, one or more messages to the one or more other wireless devices, each of the one or more messages including an indication of the identifier, where the identifier is used for determining a mobility state including a location, a speed, or a combination thereof.

An apparatus for wireless communication at a wireless device is described. The apparatus may include a processor, memory coupled with the processor, and instructions stored in the memory. The instructions may be executable by the processor to cause the apparatus to determine an identifier corresponding to the wireless device, identify one or more other wireless devices, and transmit, over a sidelink communications link, one or more messages to the one or more other wireless devices, each of the one or more messages including an indication of the identifier, where the identifier is used for determining a mobility state including a location, a speed, or a combination thereof.

Another apparatus for wireless communication at a wireless device is described. The apparatus may include means for determining an identifier corresponding to the wireless device, identifying one or more other wireless devices, and transmitting, over a sidelink communications link, one or more messages to the one or more other wireless devices, each of the one or more messages including an indication of the identifier, where the identifier is used for determining a mobility state including a location, a speed, or a combination thereof.

A non-transitory computer-readable medium storing code for wireless communication at a wireless device is described. The code may include instructions executable by a processor to determine an identifier corresponding to the wireless device, identify one or more other wireless devices, and transmit, over a sidelink communications link, one or more messages to the one or more other wireless devices, each of the one or more messages including an indication of the identifier, where the identifier is used for determining a mobility state including a location, a speed, or a combination thereof.

Some examples of the method, apparatuses, and non-transitory computer-readable medium described herein may further include operations, features, means, or instructions for identifying a public safety warning type associated with an event, and transmitting, within a payload of each of the one or more messages, public safety information indicating the public safety warning type.

Some examples of the method, apparatuses, and non-transitory computer-readable medium described herein may further include operations, features, means, or instructions for receiving an indication to transmit the public safety information within the payload, where the indication may be triggered in accordance with a network configuration, or via a user input, or a combination thereof.

In some examples of the method, apparatuses, and non-transitory computer-readable medium described herein, a payload of a first message of the one or more messages includes an indication of public safety information, navigation information, hazard information, or a combination thereof.

In some examples of the method, apparatuses, and non-transitory computer-readable medium described herein, transmitting the one or more messages may include operations, features, means, or instructions for transmitting the first message using a first set of time and frequency resources, a payload of the first message including an indication of the public safety information.

In some examples of the method, apparatuses, and non-transitory computer-readable medium described herein, transmitting the one or more messages may include operations, features, means, or instructions for transmitting the first message using a second set of time and frequency resources, a payload of the first message including an indication of the navigation information, the hazard information, or a combination thereof.

In some examples of the method, apparatuses, and non-transitory computer-readable medium described herein, transmitting the one or more messages may include operations, features, means, or instructions for performing a clear channel assessment for an unlicensed radio frequency spectrum band, determining whether the unlicensed radio frequency spectrum band may be available based on the clear channel assessment, and transmitting the one or more messages via the unlicensed radio frequency spectrum band over the sidelink communications link based on determining that the unlicensed radio frequency spectrum band may be available.

In some examples of the method, apparatuses, and non-transitory computer-readable medium described herein, transmitting the one or more messages may include operations, features, means, or instructions for identifying a set of resources within a licensed radio frequency spectrum band for transmitting the one or more messages, and transmitting the one or more messages via the set of resources over the sidelink communications link, where the set of resources include resources scheduled by a base station, predefined resources, or a combination thereof.

Some examples of the method, apparatuses, and non-transitory computer-readable medium described herein may further include operations, features, means, or instructions for transmitting, to one or more temporary nodes, an emergency signal indicating an event associated with the one or more other wireless devices, where the emergency signal includes location information associated with the event. In some examples of the method, apparatuses, and non-transitory computer-readable medium described herein, the one or more temporary nodes form a mobile hotspot, a mesh network, or any combination thereof.

A method of wireless communication at a base station is described. The method may include receiving, from a first wireless device, an indication of a type of a second wireless device that is located at a first location, determining that the second wireless device is prohibited from the first location based on the type of the second wireless device and the received indication, and transmitting a message that indicates the second wireless device is prohibited from the first location.

An apparatus for wireless communication at a base station is described. The apparatus may include a processor, memory coupled with the processor, and instructions stored in the memory. The instructions may be executable by the processor to cause the apparatus to receive, from a first wireless device, an indication of a type of a second wireless device that is located at a first location, determine that the second wireless device is prohibited from the first location based on the type of the second wireless device and the received indication, and transmit a message that indicates the second wireless device is prohibited from the first location.

Another apparatus for wireless communication at a base station is described. The apparatus may include means for receiving, from a first wireless device, an indication of a type of a second wireless device that is located at a first location, determining that the second wireless device is prohibited from the first location based on the type of the second wireless device and the received indication, and transmitting a message that indicates the second wireless device is prohibited from the first location.

A non-transitory computer-readable medium storing code for wireless communication at a base station is described. The code may include instructions executable by a processor to receive, from a first wireless device, an indication of a type of a second wireless device that is located at a first location, determine that the second wireless device is prohibited from the first location based on the type of the second wireless device and the received indication, and transmit a message that indicates the second wireless device is prohibited from the first location.

Some examples of the method, apparatuses, and non-transitory computer-readable medium described herein may further include operations, features, means, or instructions for receiving, from a UE, an indication of a mobility status of the UE.

Some examples of the method, apparatuses, and non-transitory computer-readable medium described herein may further include operations, features, means, or instructions for receiving two or more measurement reports from the UE.

Some examples of the method, apparatuses, and non-transitory computer-readable medium described herein may further include operations, features, means, or instructions for determining an association between the two or more measurement reports based on the mobility status.

Some examples of the method, apparatuses, and non-transitory computer-readable medium described herein may further include operations, features, means, or instructions for determining a first difference between each of the two or more measurement reports based on the mobility status, and tuning a result of the two or more measurement reports using the first difference based on the association between the two or more measurement reports.

Some examples of the method, apparatuses, and non-transitory computer-readable medium described herein may further include operations, features, means, or instructions for determining a second difference between a first angle of arrival for receiving a first directional communication from the UE and a second angle of arrival for receiving a second directional communication from the UE based on the mobility status, where the first difference and the second difference may be based on the received two or more measurement reports.

Some examples of the method, apparatuses, and non-transitory computer-readable medium described herein may further include operations, features, means, or instructions for predicting one or more additional measurement reports from the UE based on the first difference and the second difference, and adjusting a set of handover parameters for handing over the UE to a target base station based on the mobility status.

In some examples of the method, apparatuses, and non-transitory computer-readable medium described herein, adjusting the set of handover parameters may include operations, features, means, or instructions for adjusting a measurement threshold associated with measurement reports received from the UE based on the predicted one or more measurement reports, and adjusting a timer for handing over the UE to the target base station based on the predicted one or more measurement reports.

Some examples of the method, apparatuses, and non-transitory computer-readable medium described herein may further include operations, features, means, or instructions for predicting a measurement value based on the association between the two or more measurement reports, and initiating a handover of the UE to a target base station based on the predicted measurement value, where the handover of the UE occurs prior to a predetermined handover time.

Some examples of the method, apparatuses, and non-transitory computer-readable medium described herein may further include operations, features, means, or instructions for determining a doppler shift associated with communications with the UE based on a speed and direction of the UE, where the mobility status may be indicative of the speed and direction of the UE. In some examples of the method, apparatuses, and non-transitory computer-readable medium described herein, the mobility status includes a cyclist status.

DETAILED DESCRIPTION

Figure 1:
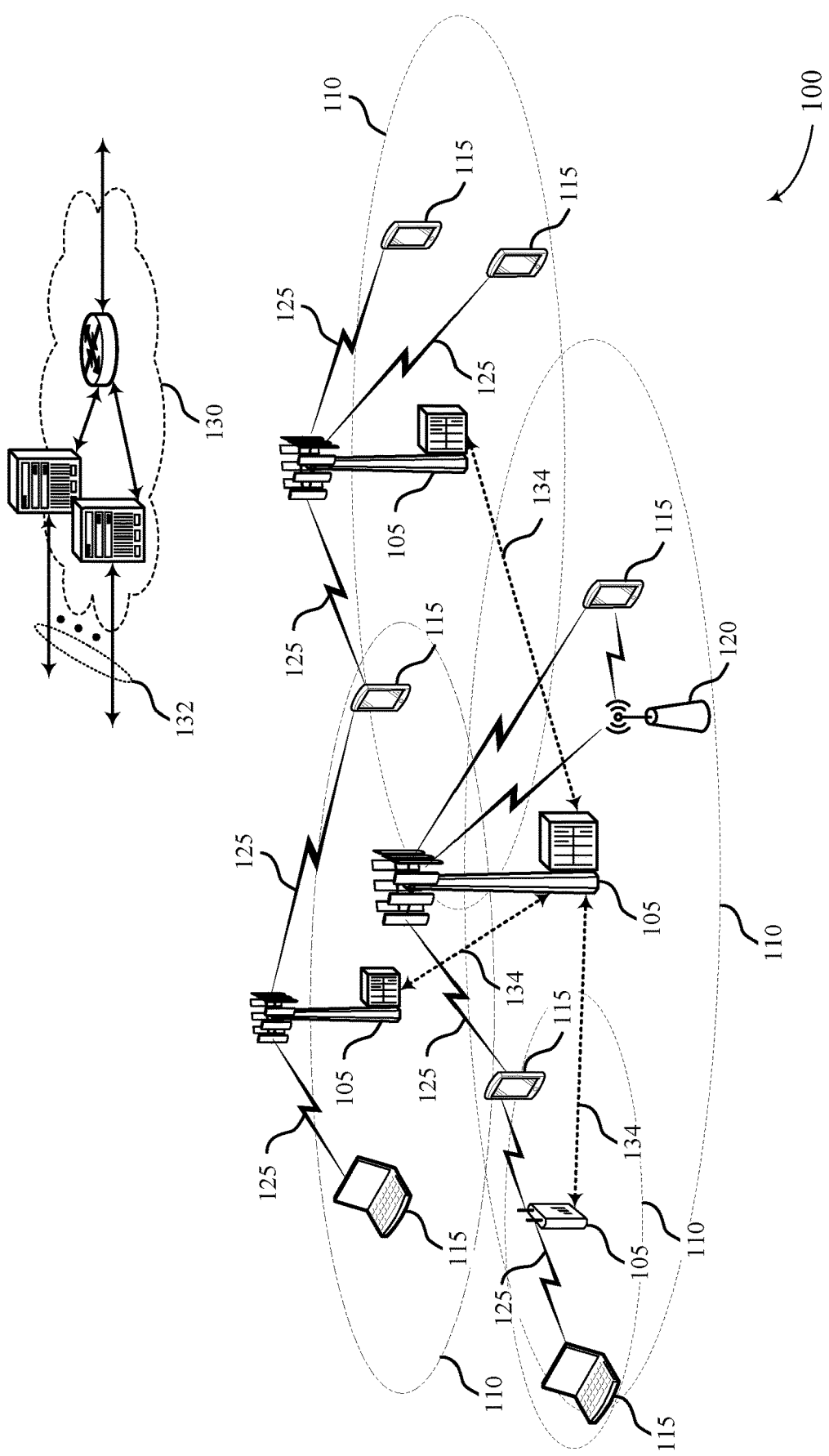
FIG. 1 illustrates an example of a wireless communications system in accordance with aspects of the present disclosure.

In many locations, bicycles may be one of the primary commuting tools used by a large number of people. As an example, bicycles may be primarily used for commuting various distances from home to work or school. As a result, bike lanes and bicycle "highways" (e.g., a set of dedicated bike lanes) may be developed to facilitate safe and accessible commuting for cyclists (e.g., on paths that are free from automobiles, pedestrian traffic, etc.). Moreover, due to the popularity of bicycles for transportation, bike sharing services may also provide a way for many people to obtain a bicycle for various purposes. Such bicycles may include a wireless device (e.g., an on board module) installed that enables the bike to be accessed and used (e.g., unlocked after a user pays a fee). The on board modules may be a dedicated Internet of Things (IoT) devices capable of wirelessly communicating with a user equipment UE (e.g., via narrowband-IoT (NB-IoT) communications, Bluetooth communications, etc.). As such, the on board module may connect with the UE of a cyclist, which may be performed using device-to-device (D2D) communications or other technology.

In some cases, bike lanes may be subject to various rules and/or regulations that establish the expected behavior of cyclists and the types of bikes that may be used. For instance, cyclists on bike lanes may be subject to speed restrictions in accordance with a speed limit (e.g., 15 km/h). In other cases, only pedal bikes may be permitted on the bike lanes, where motorized and/or electric bicycles may not be allowed. In some cases, regulations like these may be enforced (e.g., in person) by officials responsible for managing traffic on the bike lanes, which may be inefficient and unreliable. For instance, ensuring that permitted bikes are using the bike lanes and following speed limits may be a difficult task for a number of individuals spread over a large area (e.g., for bike lanes 5 km in length).

However, as described herein, the regulations for a bike lane may be tracked and enforced using various wireless communications techniques. For instance, messages transmitted within a communications network may be utilized to calculate a speed and location of a cyclist, which may ensure that cyclists remain under a speed limit while using the bike lanes (e.g., by providing a warning when a speed limit is exceeded). Further, the type of bike being ridden on the bike lanes may be regularly monitored by various wireless devices operating at or near the bike lanes.

As an example, multiple road side beacons (e.g., wireless devices located along bike lanes) may be used to identify motorized bikes, electric bikes, or other vehicles that may be prohibited from using the bike lanes. In particular, some bike lanes may include multiple road side beacons that may be used for communications with a wireless device associated with a bicycle (e.g., a UE of a cyclist and/or on board module attached/located on the bike). The road side beacons may transmit messages used for positioning and speed calculation of a bicycle (e.g., through tracking the movement of the UE and/or the on board module). For instance, the UE or the on board module may use the received messages to calculate a speed and determine a location of the associated bicycle. In some cases, the road side beacons may monitor bicycle traffic by capturing images or recording video of the bikes entering the bike lanes. Should an unauthorized or prohibited bike enter a bike lane, a road side beacon may transmit an indication to a wireless network (e.g., to a base station), which may then send a notification to the registered owner of the motorized or electric bicycle. Additionally or alternatively, in cases where the bike is owned by a bike sharing organization, then the notification may be transmitted to an on board module of the bicycle (or the cyclist's UE), which may alert the cyclist that their bike is not allowed on the bike lanes. In other examples, the system may provide various notifications to cyclists using the bike lanes, where the notifications may include emergency warnings, traffic reports, public safety information, accident avoidance, emergency rescue information, etc.

Further, by utilizing the direction and speed of the cyclist, mobility and channel measurements associated with a wireless device may be optimized (e.g., for a UE carried by a cyclist riding a bicycle). Due to a predictable route and speed of a wireless device associated with a bicycle, communications may be enhanced for such a device. For instance, the channel state for a UE may be predictable, which may include a Doppler spread and/or long term fading for communications of the UE. In such cases, it may be determined that the UE is associated with a cyclist (e.g., being located on a bicycle, and moving at speeds associated with cycling). In some aspects, the UE may receive consecutive beacon messages from road side beacons, and the UE may determine that it has a status of a "cyclist" (e.g., associated with riding a bike with some speed and direction), which may be reported to the base station. Due to the predicable movement by such a UE, the base station may identify a relationship or association (e.g., a quasi co-location (QCL) relationship or similar relationship) between consecutive transmissions by the UE. This relationship may be used to predict, for example, measurement results from the UE, where the base station may use the predicted measurement results to enable an efficient handover over the UE to a target base station. The handover may be performed through the modification of handover parameters or through triggering, by the base station, an early handover of the UE so as to minimize handover latency (e.g., when the UE and cyclist are nearing a cell edge).

Aspects of the disclosure are initially described in the context of a wireless communications system. Further examples are then provided that illustrate beacon messages and process flows. Aspects of the disclosure are further illustrated by and described with reference to apparatus diagrams, system diagrams, and flowcharts that relate to bike lane communications networks.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, base station 105 and UEs 115 may communicate with one or more beacon devices, such a road side beacons 120, which may support various wireless communications technologies. As an example, the road side beacons 120 may support the use of LTE/LTE-A/LTE-A Pro or NR communications with a base station 105 and one or more UEs 115. In some aspects, the road side beacons 120 may support the use of sidelink communications, D2D communications, NB-IoT communications, or the like. The road side beacons 120 may also support communications in licensed or unlicensed radio frequency spectrum, and may, in some cases, be an example of a small cell, a base station 105, a UE 115, an IoT device, or other wireless device. In any case, the road side beacons 120 may support wireless communication with various other wireless devices in wireless communications system 100. It is also noted that road side beacons 120 may generally be referred to a wireless devices located at or near a location designated for cycling (such as for a bike lane, a bicycle "highway," or other location), but the road side beacons 120 may be at various other locations where bicycles or other vehicles operate. As such, it is understood that road side beacons 120 may be referred to using other terminology, and the term road side beacon should not be considered limiting.

Wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

A QCL relationship between one or more transmissions or signals may refer to a spatial relationship between the antenna ports (and the corresponding signaling beams) of the respective transmissions. For example, one or more antenna ports may be implemented by a base station 105 for transmitting at least one or more reference signals and command information transmissions to a UE 115. However, the channel properties of the signals sent via the different antenna ports may be interpreted (e.g., by a receiving device) to be the same (e.g., despite the signals being transmitted from different antenna ports), and the antenna ports (and the respective beams) may be determined to be QCLed. In such cases, the UE 115 b may have respective antenna ports for receive beams used for receiving the QCLed transmissions (e.g., the reference signal). In some cases, QCLed signals may enable the UE 115 to derive the properties of a first signal (e.g., delay spread, Doppler spread, frequency shift, average power, etc.) transmitted on a first antenna port from measurements made on a second signal transmitted via a second antenna port.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support improvements to cycling at various locations (such as bike lanes) through communications between wireless devices. As an example, a set of beacon devices (e.g., road side beacons 120) may be established for a bike lane, where the road side beacons 120 may transmit messages to an on board module of a bicycle (e.g., a wireless device attached to the bicycle), to a UE 115 carried by a cyclist, or both. In some cases, the communications between the road side beacons 120 and the on board modules and/or UEs 115 may be transmitted over a sidelink communications link. The messages transmitted by the road side beacons 120 may be used to determine the speed of the bike (or UE 115) (e.g., to ensure speed limits of a bike lane are being followed), determine the location of the bike (e.g., for navigation purposes), ensure appropriate types of bicycles are using the bike lane (e.g., where motorized or electric bikes may be prohibited), or perform other techniques. Additionally or alternatively, the messages transmitted by the road side beacons may be used for emergency or public safety purposes. For instance, the road side beacons may transmit messages that indicate public safety information to the on board module and/or UE 115, which may alert a cyclist to an event (e.g., accidents, lane closures, etc.) or public safety incidents (natural disasters, fire alarms, etc.) so that the cyclist may timely and efficiently avoid the affected location. In some cases, one or more temporary nodes may be utilized in wireless communications system 100, where a road side beacon 120 (or base station 105) may provide an emergency notification to the one or more temporary nodes, which may then travel to the location of an emergency and form a wireless hotspot or mesh network to provide for more robust communications at the site of the emergency.

Wireless communications system 100 may further support the enhancement of wireless communications and mobility of UEs 115 (e.g., such as UEs 115 carried by cyclists). As an example, a cyclist's UE 115 may generally have a constant speed and direction, and channel measurement techniques may accordingly be enhanced based on the mobility of the UE 115. In some cases, upon receiving consecutive messages from road side beacons 120 (e.g., associated with a bike lane), a UE 115 may provide an indication to a base station 105 of a mobility status (e.g., a "cyclist" status). The base station 105 may determine an association (e.g., similar to a QCL relationship) between consecutive transmissions from the UE 115 (e.g., consecutive measurement reports), and may use the status of the UE 115 and the association to estimate future measurement reports. In such cases, the base station 105 may improve communications based on the mobility of the UE 115 and may, for example, perform techniques to improve handover efficiency (e.g., initiating an early handover or otherwise adjusting handover parameters to reduce handover latency).

Figure 2:
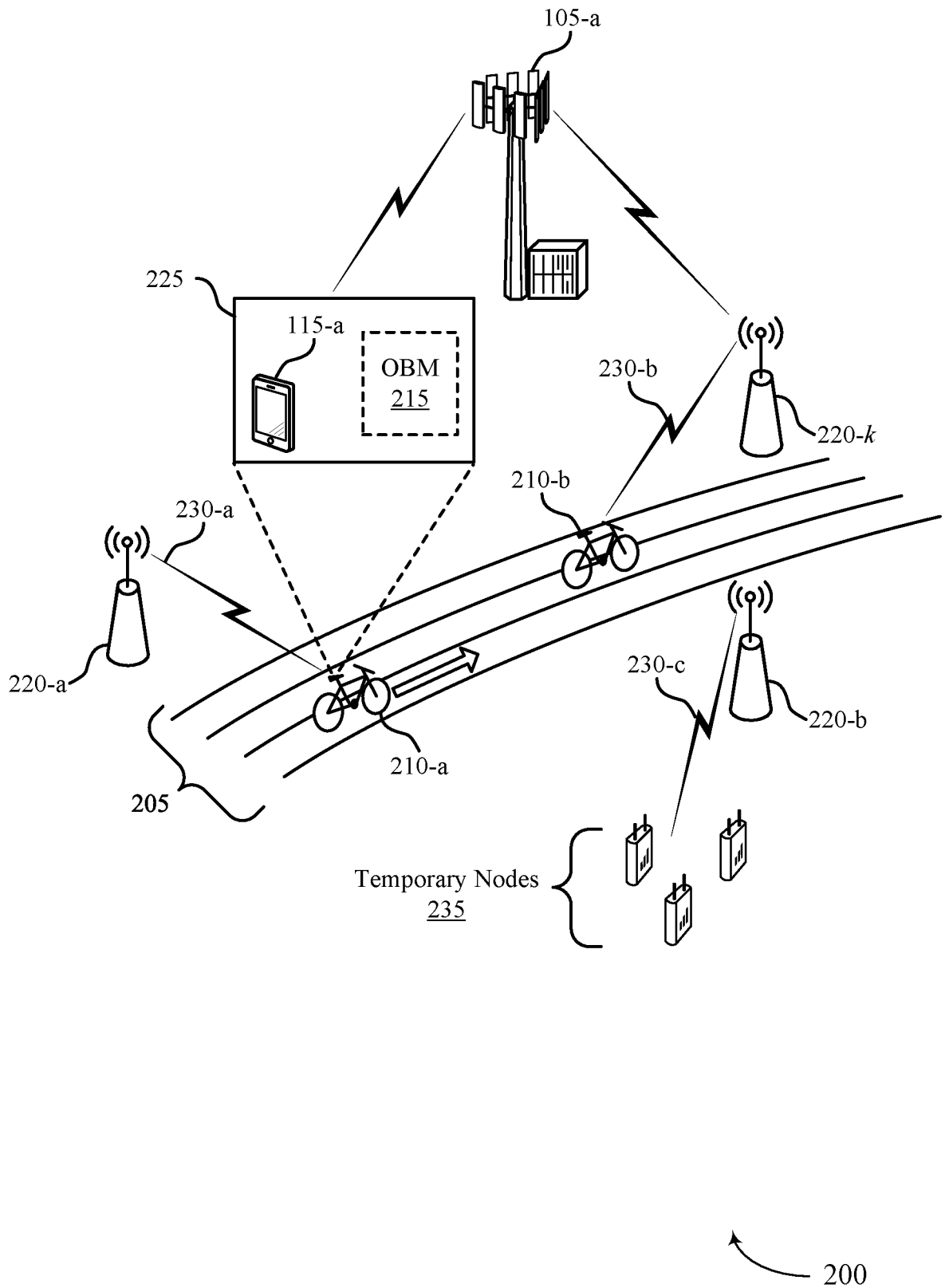
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. Wireless communications system may be an example of a communications network for bike lanes 205.

In many locations, bicycles may be one of the primary commuting tools used by a large number of people. As an example, bicycles 210 may be primarily used for commuting various distances (e.g., up to 5 km) from home to a place or work or study, or for other purposes. As a result, bike lanes 205 and bicycle "highways" (e.g., a set of dedicated bike lanes 205) may be developed to facilitate safe and accessible commuting for cyclists (e.g., on paths that are free from automobiles, other pedestrian traffic, etc.). For example, bike lanes 205 may be configured with a number of lanes, such as three respective lanes (e.g., that include one reversible or bi-directional lane that may be switched via traffic signals) that are used by cyclists to efficiently ride to various locations. However, other configurations are possible.

Due to the popularity of bicycles 210 for transportation, bike sharing services may also provide a way to obtain a bicycle 210 for various purposes. For example, an organization may offer bicycles 210 for use in exchange for a fee, where such bicycles 210 may include a wireless device (e.g., an on board module 215) installed that enable the bicycle 210 to be unlocked. For instance, these on board modules 215 may be a dedicated IoT device capable of wirelessly communicating with a UE 115 (e.g., via NB-IoT communications, Bluetooth communications, etc.). As an illustrative example, a user may utilize a smartphone (e.g., UE 115-a) to purchase use of bicycle 210-a, and UE 115-a may be used to communicate with the on board module 215 to, for example, unlock a wheel of the device, release the device from a storage rack/device, or the like. In these cases, the cyclist may carry UE 115-a with them while riding on bike lane 205. As such, the on board module 215 may connect with UE 115-a, which may be performed using a D2D communications mode, or other techniques.

In some cases, the bike lanes 205 may have various rules and/or regulations related to the behavior of cyclists and the types of bicycles 210 that may be used. For instance, cyclists on bike lanes 205 may be subject to speed restrictions, for example, in accordance with a speed limit (e.g., 15 km/h). In other cases, pedal bikes may be permitted on bike lanes 205, where motorized and/or electric bicycles may be prohibited. In any case, regulations like these and others may be enforced by local police or other officials responsible for managing the traffic on bike lanes 205, which may be inefficient and unreliable. As an example, a person may be located at respective entrances of bike lanes 205 to ensure that unauthorized vehicles or bikes are not utilizing bike lanes 205 when not allowed. In other cases, the speeds of different cyclists on bike lanes 205 may be difficult to continuously monitor, which may create unsafe conditions on bike lanes 205.

However, as described herein, the regulations for bike lanes 205 may be tracked and enforced using various wireless communications techniques. For instance, the transmission of messages within wireless communications system 200 may be utilized to ensure that cyclists remain under a speed limit while using bike lanes 205. Further, the type of bicycle 210 being ridden on bike lanes 205 may be regularly monitored by various wireless devices operating near bike lanes 205.

As an example, multiple road side beacons 220 (e.g., wireless devices located along bike lanes 205) may be used to identify motorized bikes, electric bikes, or other prohibited vehicles attempting to utilize bike lanes 205. In particular, bike lanes 205 may have multiple road side beacons 220 (e.g., road side beacons 220-a through 220-k) that may be used for communications with a wireless device 225 associated with a bicycle 210 (e.g., a UEs 115 and/or on board module 215). For instance, the road side beacons 220 may be used for positioning and speed calculation of bicycle 210-a through tracking the movement of a wireless device 225, which may include UE 115-a and/or on board module 215.

In some cases, the road side beacons 220 may monitor bicycle traffic by capturing images or recording video of the bicycles 210 entering bike lanes 205. Should an unauthorized or prohibited bicycle 210 enter bike lanes 205, a road side beacon 220 may transmit an indication to a wireless network (e.g., to base station 105-a), which may then send a notification to the registered owner of the motorized/ electric bicycle. Additionally or alternatively, in cases where the bicycle 210 is owned by a bike sharing organization, then the notification may be transmitted to an on board module 215 located on the bicycle 210, which may alert the cyclist that their bicycle 210 is not allowed on bike lanes 205 (e.g., as the owner may not be the same as the cyclist).

In other examples, the system may provide various notifications to cyclists using bike lanes 205, where the notifications may include emergency warnings, traffic reports, public safety information, accident avoidance, emergency rescue information, or the like. Further, by utilizing the direction and speed of the cyclist, mobility and channel measurements associated with a wireless device 225 may be improved (e.g., for a UE 115 carried by a cyclist riding a bicycle 210).

In some examples, through the use of the road side beacons 220, bicycles with an allowed identifier (ID) may be allowed to enter the bike lane 205. As an example, a cyclist with a smartphone (e.g., a UE 115) may pair the smartphone to the ID of the bike the cyclist is riding (e.g., by taking a picture of the bike ID or through other techniques). As such, the bike ID may be transmitted to one or more road side beacons 220, which may use the information to identify the bicycle 210 being ridden on bike lanes 205. In some examples, a road side beacon 220 may identify whether a bicycle 210 is permitted on bike lanes 205 through the bike ID. For instance, each road side beacon 220 may have access to a database of bike IDs (e.g., through base station 105-a or through other means) and may verify that a bike ID signaled by the wireless device 225 associated with bicycle 210-a is allowed to use bike lanes 205.

In some examples, the on board module 215 or the UE 115 may calculate the speed of the cyclist based on messages received from the road side beacons 220. For instance, processor and memory components of the on board module 215 or UE 115-a may calculate the speed of the associated bicycle 210-a (and therefore the speed of the cyclist, UE 115-a, and/or on board module 215) through observed time difference of arrival (OTDOA), reference signal time difference (RSTD) measurements, or other techniques, which may be based on signals transmitted by road side beacons 220. In cases where the bicycle 210 (and the cyclists) are exceeding a speed limit, entering a wrong lane, or otherwise violating regulations or rules of the bike lanes 205, UE 115-a and/or the on board module 215 may signal the violation to the cyclist, such as through an alarm, notification, or other signal.

The road side beacons 220 that are near bike lanes 205 may each support directional communications (e.g., beamformed, unicast, broadcast) with a cyclist and/or a bicycle 210. In some examples, such communications may not involve communicating with base station 105-a or other network entity. In some examples, communications between the road side beacons 220 and a wireless device 225 may be performed via a sidelink communications link 230. As an example, a road side beacon 220-a may communicate with a wireless device 225 over sidelink communications link 230-a. In such cases, each road side beacon 220 may transmit one or more messages (e.g., beacon messages) over a sidelink communications link 230 to communicate with a wireless device 225 associated with a bicycle 210 using bike lanes 205. In some cases, and as described in further detail below, the messages transmitted by a road side beacon 220 may include a beacon ID and an optional payload. In such cases, the wireless device 225 (e.g., including UE 115-a or on board module 215) may derive the speed and location, for example, via OTDOA or other positioning techniques, using the beacon ID.

In some cases, while transmitting the beacon messages, a road side beacon 220 may avoid interference and other nearby transmissions from other devices. For example, one or more road side beacons 220 may be synchronized with base station 105-a or may use GPS timing. In such cases, the synchronous communications may assist the road side beacons 220 in minimizing interference with other signal communicated in the proximity of one or more road side beacons 220 (or in wireless communications system 200). Additionally or alternatively, a road side beacon 220 may perform a clear channel assessment (such as listen-before-talk (LBT) procedures) to determine whether a channel is occupied, and when the channel is available, may transmit the beacon message.

In wireless communications system 200, sidelink communications may support the transmission of public safety messages. As such, the payload of a beacon message may include public safety information or a public safety message (which may be triggered by a particular transmission mode, such as a public safety mode). In some cases, the transmission of the public safety information may be transmitted by multiple road side beacons 220 over the sidelink communications links 230 in response to a manual trigger (e.g., activated by a user), may be based on a network configuration or signaled to the road side beacons 220 by base station 105-a. As an example, one or more base stations 105-a may transmit a signal to multiple road side beacons 220-a through 220-k that triggers the transmission of the public safety information to nearby UEs 115 and/or on board modules 215. As such, the transmission of the public safety information may have a highest priority at the receiving wireless device 225, and may override other messages transmitted or receive by the wireless device 225. In such cases, the wireless device 225 receiving the public safety information may refrain from transmitting to other wireless devices 225 (to prevent from using network resources) and may also discard or drop other received messages due to the priority of the public safety information.

The beacon messages may be transmitted by road side beacons 220 via an unlicensed radio frequency spectrum band, and the transmitting road side beacon 220 may also use various channel reservation or clear channel assessment techniques prior to transmitting. For instance, the road side beacons may use carrier sense multiple access (CSMA) or listen-before-talk (LBT) techniques to determine whether the unlicensed radio frequency band or TTIs are available for transmission. Additionally or alternatively, transmission of beacon messages via the unlicensed radio frequency spectrum band may be sent without the use of conflict avoidance techniques, and may instead be transmitted using network configured or pre-configured resources. In other cases, the beacon messages may be transmitted based on configured resources, which may be scheduled by base station 105-a. In some examples, the beacon message may be transmitted on resources indicated by a scheduling resource grant, or transmitted on resources associated with semi-persistent scheduling (SPS), or the like.

In some examples, the wireless device 225 may receive the public safety information within a beacon message, and may participate in the distribution of the public safety information. As an example, upon receiving a beacon message having public safety information within the payload of the beacon message, the wireless device 225 may transmit the same public safety information to other wireless devices 225 (e.g., via sidelink communications). The other wireless devices 225 may then relay or repeat the same information to ensure each nearby device has received the public safety information and so that users are aware of the event or emergency.

When emergencies occur on or near bike lane 205, cyclists involved may transmit information regarding the emergency, which may include, for example, transmitting or receiving messages, images, video, or the like. In such cases, the wireless devices 225 used for such transmissions may communicate with base station 105-*a* (e.g., with low latency and high reliability). However, the large volume of data may, in some cases, congest sidelink communications links 230 and/or may overwhelm the uplink and/or downlink capabilities of base station 105-*a* (e.g., providing a primary cell (PCell).

As an alternative, one or more temporary nodes 235 may be utilized to relive network congestion and enable efficient and reliable communications by wireless devices 225. In one example, the temporary nodes 235 may comprise one or more drones (e.g., unmanned aerial vehicles), which may be dispatched to the location of an accident. In such cases, the drones may be triggered by an emergency beacon received from one or more of the road side beacons 220 (e.g., from road side beacon 220-*b* transmitting over sidelink communications link 230-*c*). In such cases, the beacon messages transmitted by the road side beacons 220 may include positioning information to the drones (or other types of temporary nodes 235). As such, the drones may capture and record images and/or video from the scene of the accident. Further, the drones may form a mobile hotspot or mesh network, which may support various communications schemes, such as CA and/or dual connectivity, directional or beamformed transmissions (e.g., in frequency range 2 (FR2)), communications via unlicensed spectrum band, or the like. The images, videos, and/or messages from the wireless devices 225 near the emergency or accident may be relayed to base station 105-*a* or to the hotspot/mesh network formed by the temporary nodes 235, which may aid first responders in rescue operations or aid officials in assessing the severity of the event. In some examples, base station 105-*a* or hotspot/mesh network formed by the temporary nodes 235 may multicast the information for emergency operation and may also trigger a traffic detour for other cyclist (or other users in general) who may be unaware of the incident affecting bike lanes 205.

In some examples, a wireless device 225 may generally have a predictable route and speed, and the link with base station 105-*a* may be a nearly line-of-sight link. As such, communications may be enhanced for the wireless device 225. For instance, the channel state for UE 115-*a* may be predictable, which may include a Doppler spread and/or long term fading for communications by UE 115-*a*. In such cases, it may be determined that the UE 115-*a* is associated with a cyclist (e.g., being located on a bicycle, and moving at speeds associated with cycling). UE 115-*a* may receive one or more consecutive beacon messages from road side beacons 220-*a* through 220-*k*, and UE 115-*a* may determine that it has a status of a "cyclist" (e.g., associated with riding a bike within some speed and direction). As such, UE 115-*a* may transmit a status indication to base station 105-*a* that indicates the determined status (e.g., via uplink control information, higher layer signaling, via an indication of the UE's capabilities, etc.). Accordingly, base station 105-*a* may communicate with UE 115-*a* based on the indicated status.

Due to the predicable movement by such a UE 115, base station 105-*a* may identify a relationship or association between consecutive transmissions by UE 115-*a*. For instance, when communicating with base station 105-*a*, UE 115-*a* may measure various parameters of signals (e.g., reference signals) received from base station 105-*a* (and other nearby base stations 105). In such cases, UE 115-*a* may perform layer 3 measurements (e.g., reference signal received power (RSRP) measurements, reference signal received quality (RSRQ) measurements, or other measurements for a reference signal strength indicator (RSSI)). However, in cases of UE 115-*a* having a "cyclist" status, UE 115-*a* may have a nearly constant speed and experience a same Doppler shift. As such, base station 105-*a* may determine a QCL-like relationship between consecutive measurement reports transmitted by UE 115-*a*. In such cases, base station 105-*a* may generate a difference between respective measurement reports (e.g., delta 1), which may be used to tune the measurement results.

Further, an uplink angle-of-arrival (AOA) and uplink beam at base station 105-*a* may be identified by base station 105-*a*, which may have a constant or near constant difference (e.g., delta 2), which may be based on the speed and motion of UE 115-*a*. In such cases, the values of the difference(s) (e.g., delta 1 and delta 2) may be derived based on the received measurement reports. In some cases, the differences may be determined based on long-term measurement reports (e.g., on the order of minutes). In any case, based on the predictable measurements (e.g., layer 3 RSRP/RSRQ measurements), base station 105-*a* may predict handover and/or redirection for UE 115-*a*. As an example, base station 105-*a* may adjust handover parameters to enable more efficient handover of a UE 115 that has indicated that the UE 115 is in cyclist status. Among other examples, the adjustment of the handover parameters may include updating (e.g., lowering) measurement threshold(s) used for measurements, and may also exchange a context earlier (reduce a timer) as compared to conventional handover procedures, which may result in reduced handover latency for the UE 115. Additionally or alternatively, base station 105-*a* may not adjust the handover parameters, and may instead initiate an early handover of the UE 115.

Figure 3:
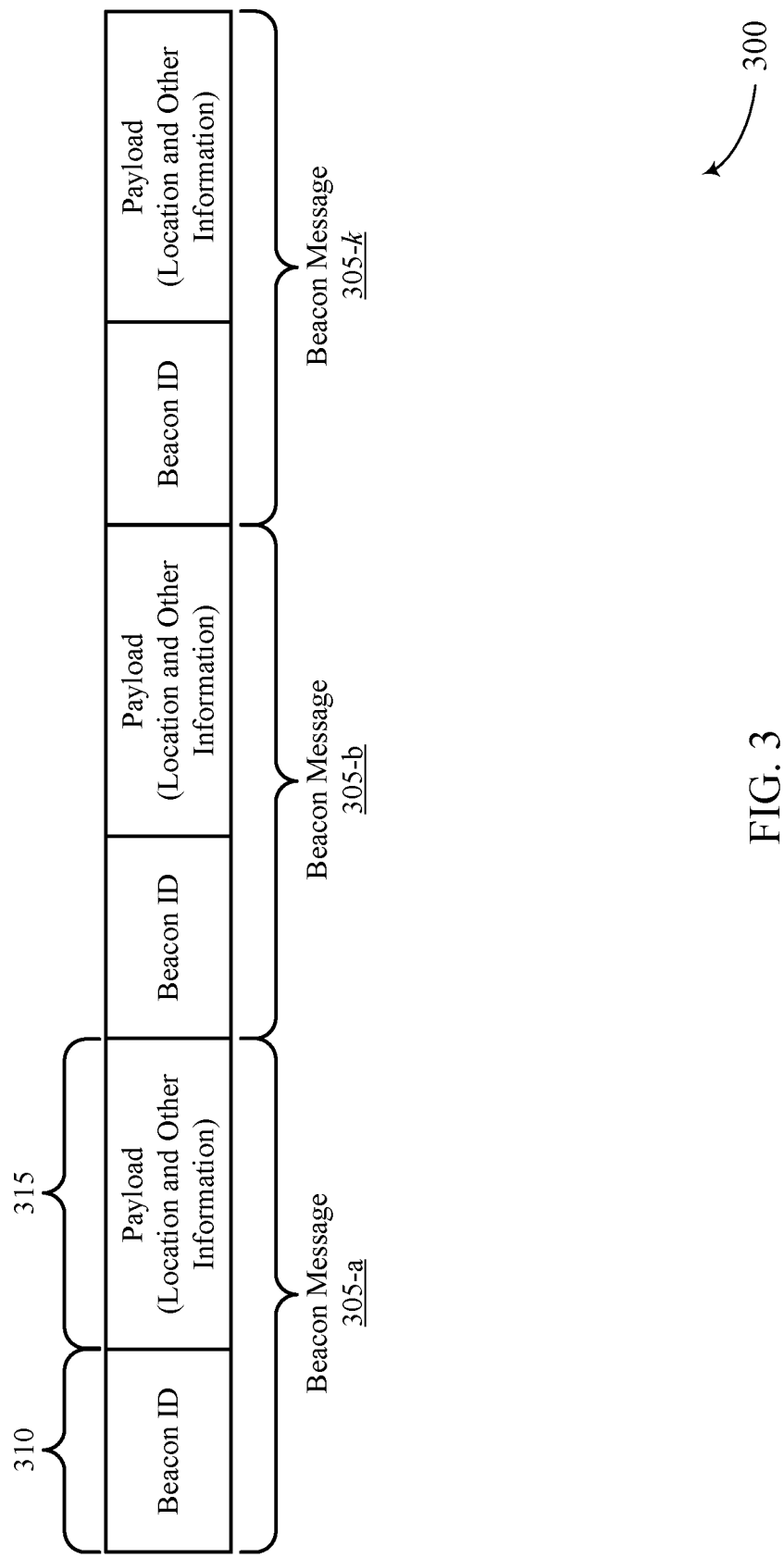
FIG. 3 illustrates an example of beacon messages in accordance with aspects of the present disclosure.

FIG. 3 illustrates an example of beacon messages 300 in accordance with aspects of the present disclosure. In some examples, beacon messages 300 may implement aspects of wireless communications systems 100 and 200. Beacon messages 300 may be an example of messages 305 transmitted by a wireless device or a beacon device, such as a road side beacon (e.g., a road side beacon 120 or a road side beacon 220 described with reference to FIGS. 1 and 2, respectively). For instance, beacon messages 300 may illustrate multiple messages 305 (e.g., messages 305-*a* through 305-*k*) which may be transmitted by respective road side beacons. Further, each road side beacon may transmit one or more of the messages 305 to a number of wireless devices (e.g., a UE 115 and/or on board modules, as described with reference to FIG. 2), such that the wireless device may receive consecutive messages 305 from different road side beacons (e.g., as the device travels along a bike lane).

Each message 305 transmitted by the road side beacons may have a particular message structure that includes information identifying the transmitting road side beacon (such as a beacon ID 310), and may optionally include additional information in a payload 315 of the message 305. The payload 315 may include location information or other information associated with the road side beacon. In some examples, a payload 315 may be excluded from the message 305 if a beacon ID 310 is unique.

Various techniques may be used to generate beacon IDs 310. For instance, a unique beacon ID 310 may be based on a hardware ID of the transmitting road side beacon. In other cases, a road side beacon may randomly select an ID from a set of beacon IDs 310, or may otherwise generate a random beacon ID 310 based on various parameters. As an illustrative example, a beacon ID may be generated in accordance with the following equation:

$$\text{Beacon ID} = a * \text{random sequence} + b * \text{Geographic\_Information} + c * \text{Time\_information} + d * \text{other information} \quad (1)$$

where a, b, c, and/or d may be non-negative constants. Further, the Geographic_information may include or may be based on a location of a respective road side beacon (e.g., global positioning system (GPS) coordinates, an intersection, etc.). The Time_information may include or be based on when a particular message is transmitted. In some examples, to support a large set of beacon IDs 310 that may be generated, the sequences used in generating the beacon ID 310 may be non-orthogonal sequences. Additionally or alternatively, the Geographic_information and Time_information may be shortened versions of the geographic information and the time information, which may save overhead. It is also noted that other methods may be used to generate the beacon ID, and the present example is one possible technique.

The payload 315 of a message 305 may include location information or other types of information. For instance, the payload may include public safety information used to notify a wireless device of a public safety event or warning. In some examples, a public safety message may be represented by a pre-defined code (or abbreviated code or other representation, which may maintain or minimize a payload of the beacon messages). For instance, a payload 315 of the beacon message 305 may include one or more bits that indicate a particular type of public safety event (e.g., where three bits indicating 100 may correspond to an earthquake, whereas three bits indicating 101 may correspond to a fire alarm).

In some cases, the payload 315 of the beacon messages may include other information used for assisting cyclists on the bike lane. For example, navigation functionality may be enabled through the use of the beacon messages transmitted by the road side beacons. In such cases, exit reminder may be provided to the wireless device based on routing or guidance. For instance, a set route may be programmed using a cyclist's UE 115 (or an on board module of a bicycle), and based on the beacon messages (and a location of the corresponding road side beacon(s)) received while riding on the bike lane, the UE 115 and/or on board module may provide a signal or indication when the cyclist is to exit the bike lane (e.g., based on the route). More specifically, a user may input a destination (a location, an address, etc.) into a wireless device, and when approaching a nearest exit of the bike lane, the on board module may recognize the respective beacon ID 310 included in messages received from one or more road side beacons. The wireless device may then match the route and remind the cyclist when/where to exit the bike lane.

In other examples, the payload 315 of a message 305 may include an emergency notification, which may be used to notify one or more temporary nodes of an event. In such cases, the payload 315 may include an indication of the location of the event, or other similar information that may enable the temporary nodes to travel to the location of the event (in the case where the temporary nodes are mobile), such that the temporary nodes may form a mesh network or mobile hotspot at the location.

In some cases, the messages 305 carrying different information may be transmitted on different resources. For example, a message 305 including a payload 315 with public safety information may be transmitted on a first set of time/frequency resources (e.g., RBs, TTIs, etc.). Additionally a message 305 include a payload 315 with assistance information (e.g., navigation information) may be transmitted on a second set of time/frequency resources that is different from the first set of time/frequency resources. Other schemes or configurations may be used to differentiate the payload 315 carried by respective messages 305.

Figure 4:
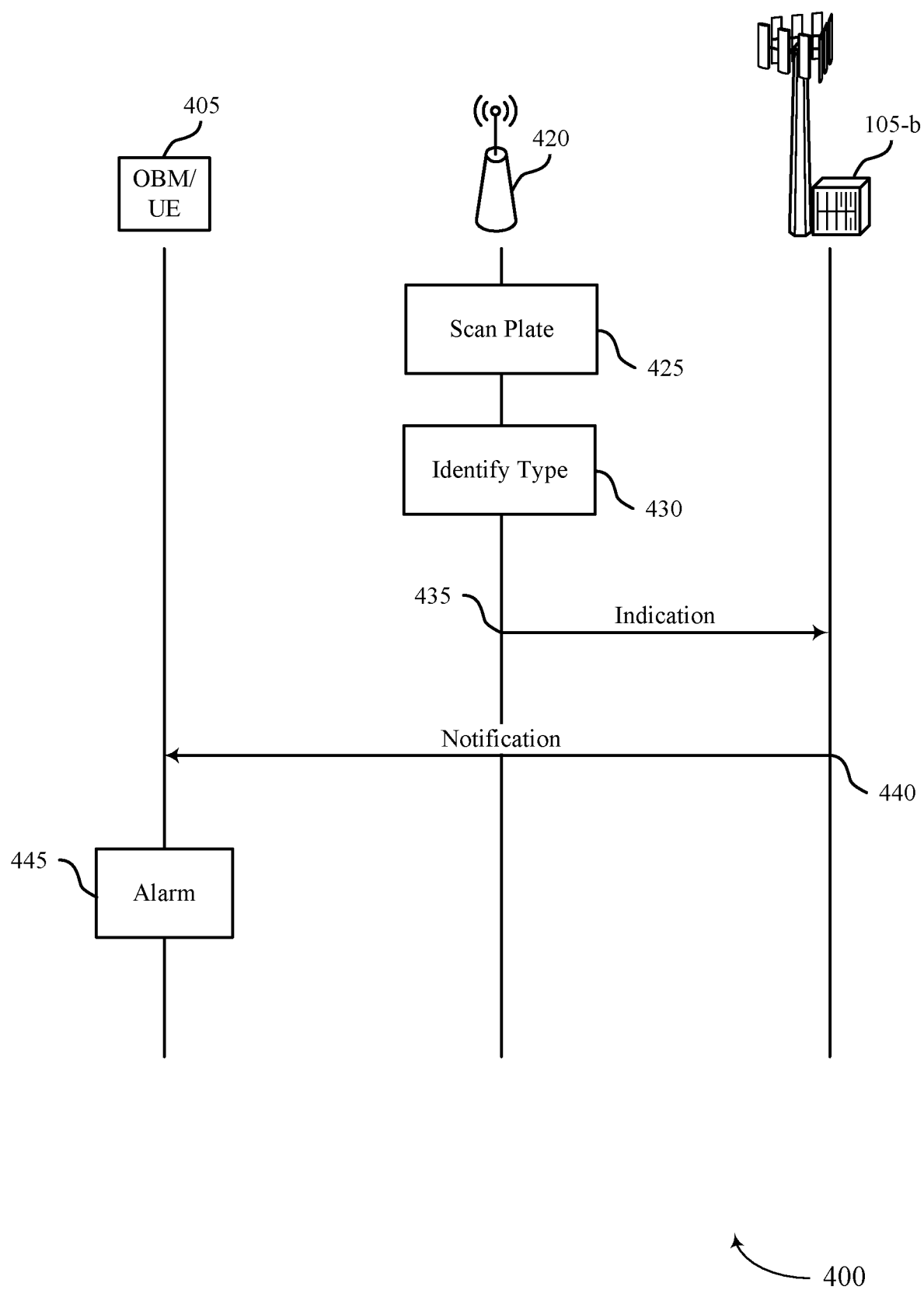
FIGS. 4 through 6 illustrate examples of a process flow in a system in accordance with aspects of the present disclosure.

FIG. 4 illustrates an example of a process flow 400 in a system in accordance with aspects of the present disclosure. In some examples, process flow 400 may implement aspects of wireless communications systems 100 and 200. For example, process flow 400 includes a wireless device 405 (e.g., including a UE 115 or on board module associated with a cyclist or attached to a bicycle) and base station 105-*b*. Process flow 400 may further include a road side beacon 420, which may be an example of a road side beacon 120 or road side beacon 220 described with reference to FIGS. 1 and 2. Process flow 400 may support the use of a network to monitor the use of a bike lane, for example, to ensure that permitted vehicles are using the bike lane.

In some locations, motorized bicycles and electrical bicycles may be registered with a local government or municipality. For instance, each motorized or electoral bicycle within a location or region may install a plate that is registered with the government and identifies the bicycle as motorized or electric. As such, at 425, the road side beacon 420 may be used to scan the plate of the cycle entering the bike lane. The road side beacon 420 may then identify the associated registration, thereby identifying whether the scanned plate is associated with a bicycle which is not permitted on the bike lane (e.g., through accessing a local database of registered bikes). As such, at 430, the road side beacon 420 may identify the type of bike on the bike lane based on the plate and corresponding registration.

At 435, the road side beacon 420 may transmit an indication to base station 105-*b* to notify the network that the bicycle (or type of bike) may not be allowed, but is using or has entered the bike lane. In such cases, base station 105-*b* (and corresponding core network) may communicate with a database that includes the registration information for the registered bikes, including the information used to transmit an alarm notification to the owner or operator of the prohibited bike. For example, at 440, base station 105-*b* may transmit an alarm notification to the wireless device 405 of the registered owner of the prohibited motor bike or electric bicycle, thereby signaling that the cyclist is not allowed in the bike lane in accordance with regulations. In other examples, such as bike sharing services, the wireless device 405 may be associated with the cyclist (who may be different from the owner), and the notification at 440 may be transmitted to the wireless device 405 of the cyclist.

Figure 5:
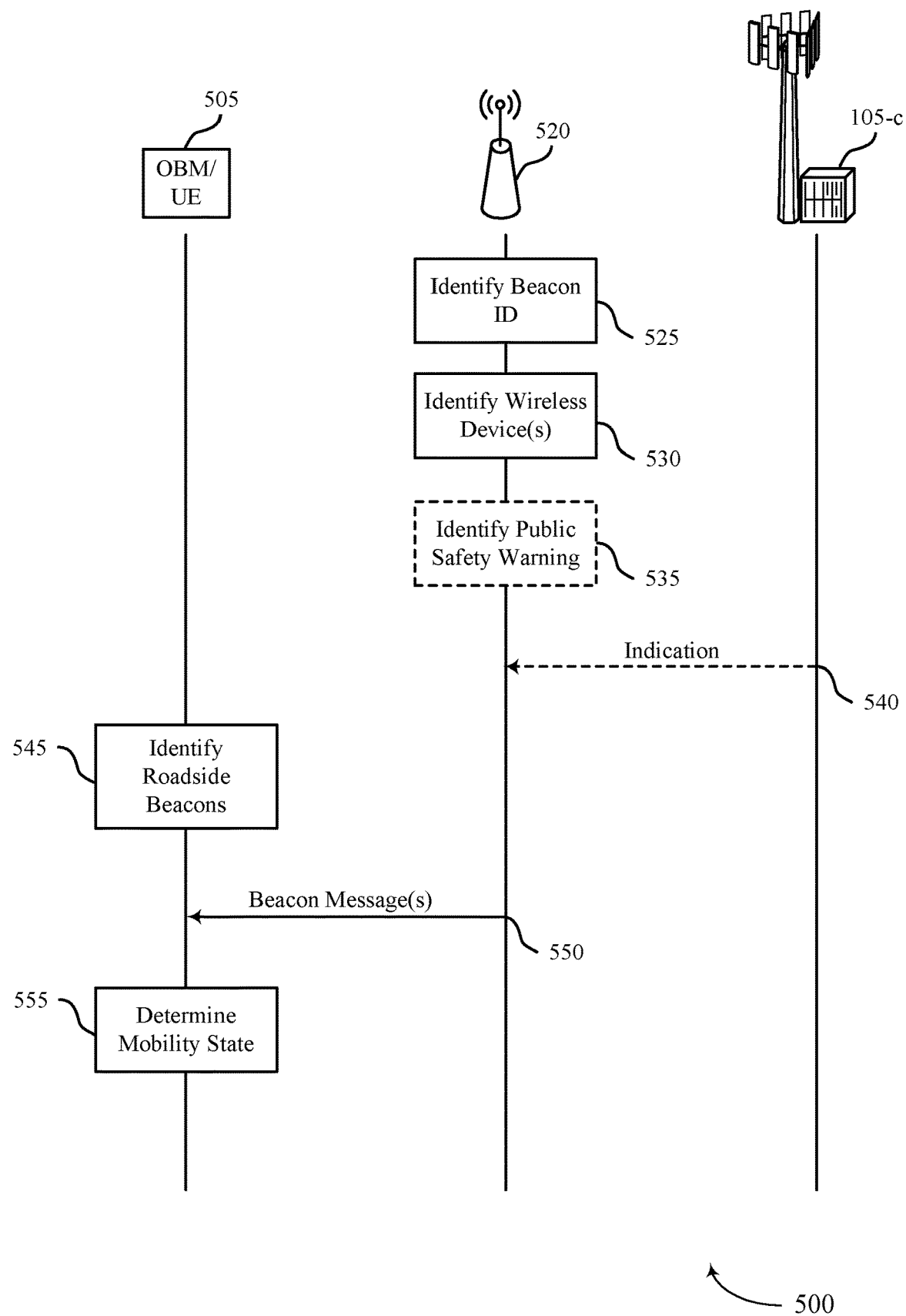

FIG. 5 illustrates an example of a process flow 500 in a system in accordance with aspects of the present disclosure. In some examples, process flow 500 may implement aspects of wireless communications systems 100 and 200. Process flow 500 includes a wireless device 505 (which may include a UE 115 and/or an on board module), a road side beacon 520, and base station 105-*c*, which may be examples of the corresponding devices described with reference to FIGS. 1, 2, and 4.

At 525, road side beacon 520 may determine an identifier corresponding to the road side beacon 520 (e.g., a beacon ID). For instance, the beacon ID may be generated by the road side beacon 520, or may be unique to the road side beacon 520 (e.g., based on a hardware ID).

At 530, road side beacon 520 may identify one or more wireless devices 505. For instance, the road side beacon 520 may identify the wireless devices 505 on a bike lane, where the wireless devices 505 may transmit an indication of a bike ID or other information used to identify an associated bike.

At 535, road side beacon 520 may optionally identify a public safety warning type associated with an event. For example, the road side beacon may identify a natural disaster or other type of public safety event. In such cases, the road side beacon may transmit, within a payload of a beacon message, an indication of the event to notify the wireless devices 505 of the event. At 540, the trigger to transmit a beacon message including public safety information may optionally be sent from base station 105-*c*. In other examples, the public safety message may be manually triggered.

At 545, the wireless device 505 may identify a plurality of beacon devices (e.g., including road side beacon 520). In some cases, the beacon devices identified may be located at or near a bike lane being used by a bike associated with wireless device 505. At 550, the wireless device 505 may receive, over a sidelink communications link, one or more messages from each beacon device of the plurality of beacon devices. For instance, road side beacon 520 and other road side beacons may each transmit beacon messages to the wireless device 505 (e.g., in accordance with the beacon messages described with reference to FIG. 3).

At 555, the wireless device 505 may determine a mobility state of the wireless device based at least in part on the received one or more messages. In some cases, the mobility state may include a location of the wireless device, a speed of the wireless device, or a combination thereof. In some cases, the mobility state may be determined based on a beacon ID transmitted within the beacon message(s) received by the wireless device 505.

Figure 6:
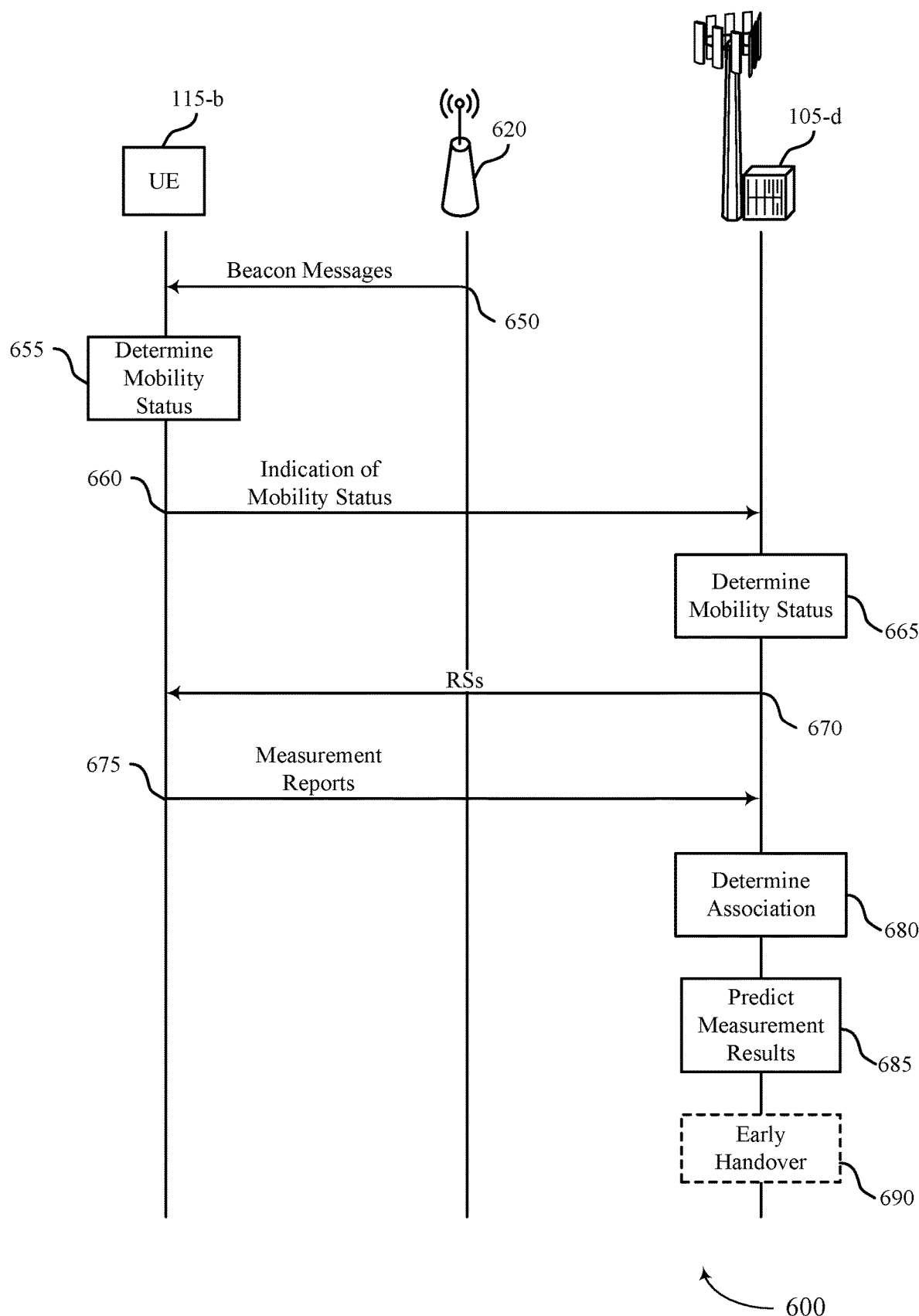

FIG. 6 illustrates an example of a process flow 600 in a system in accordance with aspects of the present disclosure. In some examples, process flow 600 may implement aspects of wireless communications systems 100 and 200. Process flow 600 includes a wireless device (which may include a UE 115-*c* and/or an on board module), a road side beacon 620, and base station 105-*d*, which may be examples of the corresponding devices described with reference to FIGS. 1, 2, 4, and 5.

At 650, road side beacon 620 (and other road side beacons) may transmit beacon messages to UE 115-*b*. Upon receiving multiple beacon messages (e.g., consecutive beacon messages), UE 115-*c* may determine a mobility status based on the messages at 655. For instance, UE 115-*b* may determine that it has a "cyclist" status due to the receipt of the multiple beacon messages from road side beacons (which may be configured for a bike lane). In such cases, at 660, UE 115-*b* may transmit, and base station 105-*d* may receive, an indication of a mobility status of UE 115-*b*.

At 665, base station 105-*d* may determine the mobility status of UE 115-*b* based on the received indication. At 670, UE 115-*b* may receive one or more RSs from base station 105-*d*. Additionally, UE 115-*b* may receive RSs from other, nearby, base stations 105 (not shown). In any case, UE 115-*b* may perform measurement on the received RSs (e.g., RSRP measurements, RSRQ measurements), and may transmit, to base station 105-*d*, two or more measurement reports. In some cases, the two or more measurement reports may be for consecutive measurements, or may be measurements over a period of time.

At 680, base station 105-*d* may determine an association between the two or more measurement reports based on the mobility status of UE 115-*b*. The association may include a QCL-like association, where a Doppler shift may remain relatively constant when UE 115-*b* has the "cyclist" status. In some cases, at 685, base station 105-*d* may predict one or more additional measurement reports from UE 115-*b* based on the identified differences between, for example two measurement reports and/or AOA of transmission received at base station 105-*d*. In some cases, at 690 base station may initiate an early handover of UE 115-*b* (e.g., a handover that takes place before a time when the handover may otherwise be triggered, for example, based on signal quality measurements, or when UE 115-*b* nears a cell edge, or the like) to another base station (e.g., based on the predicted measurements). In some cases, base station 105-*d* may adjust a set of handover parameters (which may include adjusting a measurement threshold associated with measurement reports received from UE 115-*b* and/or adjusting a timer for handing over the UE 115-*b* to a target base station 105). Additionally or alternatively, base station 105-*d* may initiate the early handover of UE 115-*b* to the target base station 105 based on a predicted measurement value, where the early handover of UE 115-*b* to the target base station 105 occurs prior to a predetermined handover time.

Figure 7:
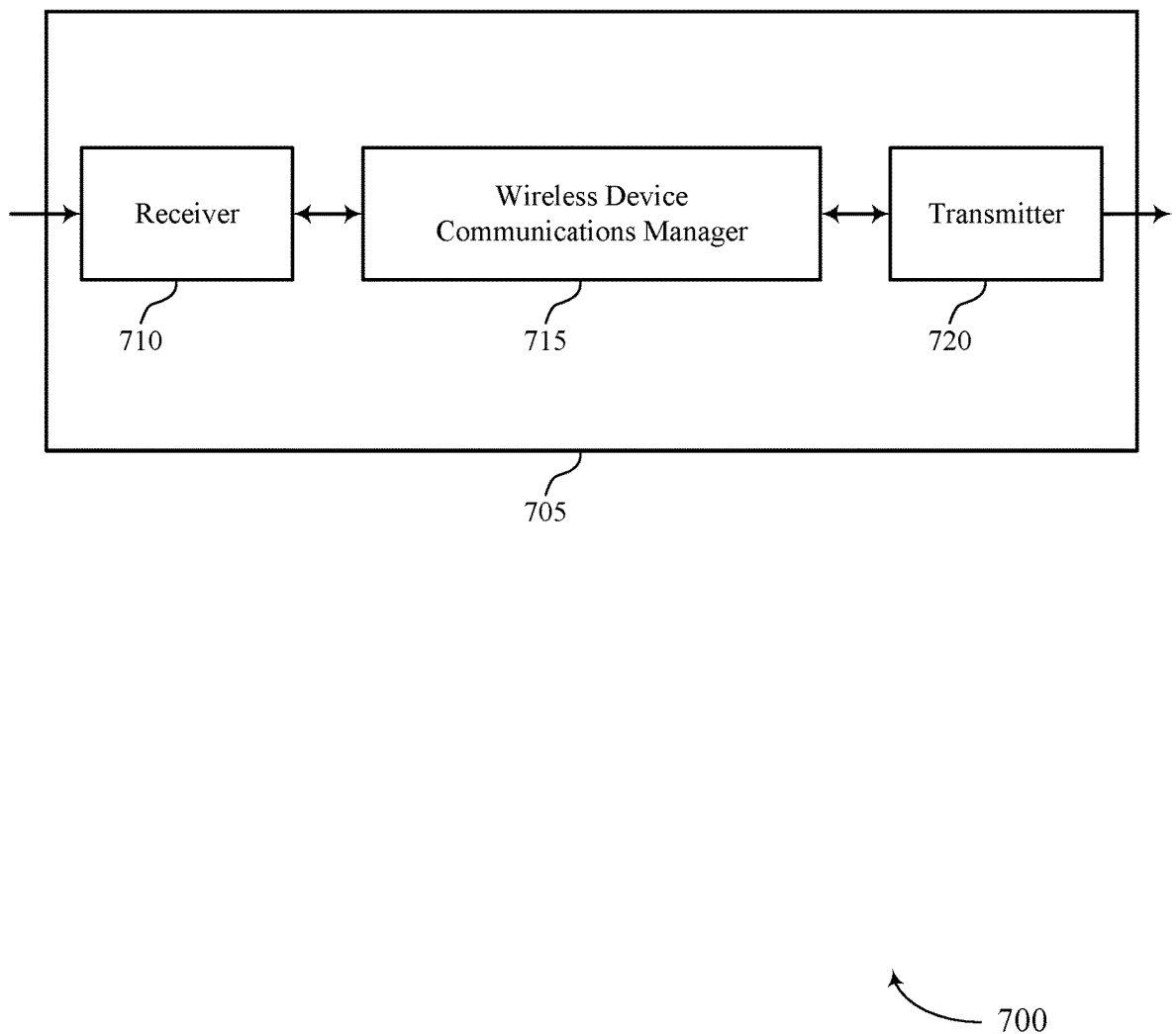
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a wireless device, such as a UE 115, an on board module, a beacon device (such as a road side beacon), or other wireless device, as described herein. The device 705 may include a receiver 710, a wireless device communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to bike lane communications networks, etc.). Information may be passed on to other components of the device 705. The receiver 710 may be an example of aspects of the transceiver 1220 described with reference to FIG. 12. The receiver 710 may utilize a single antenna or a set of antennas.

The wireless device communications manager 715 may identify a set of beacon devices, receive, over a sidelink communications link, one or more messages from each beacon device of the set of beacon devices, and determine a mobility state of the wireless device based on the received one or more messages, the mobility state including a location of the wireless device, a speed of the wireless device, or a combination thereof. The wireless device communications manager 715 may be an example of aspects of the wireless device communications manager 1210 described herein.

In some examples, the wireless device communications manager 715 may determine an identifier corresponding to the wireless device, identify one or more other wireless devices, and transmit, over a sidelink communications link, one or more messages to the one or more other wireless devices, each of the one or more messages including an indication of the identifier, where the identifier is used for determining a mobility state including a location, a speed, or a combination thereof. The wireless device communications manager 715 may be an example of aspects of the wireless device communications manager 1210 or 1310 as described herein.

Further, the actions performed by the wireless device communications manager 815 as described herein may be implemented to realize one or more potential advantages. One implementation may allow a wireless device to efficiently compute its own speed or determine its own location through a set of received signals, which may avoid the wireless device transmitting additional signaling (thereby saving power). Another implementation may provide improved quality and reliability of service at the wireless device, as latency when the device is being handed over to a target base station may be reduced.

The wireless device communications manager 715, or its sub-components, may be implemented in hardware, code (e.g., software or firmware) executed by a processor, or any combination thereof. If implemented in code executed by a processor, the functions of the wireless device communications manager 715, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The wireless device communications manager 715, or its sub-components, may be physically located at various positions, including being distributed such that portions of functions are implemented at different physical locations by one or more physical components. In some examples, the wireless device communications manager 715, or its sub-components, may be a separate and distinct component in accordance with various aspects of the present disclosure. In some examples, the wireless device communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1220 described with reference to FIG. 12. The transmitter 720 may utilize a single antenna or a set of antennas.

Figure 8:
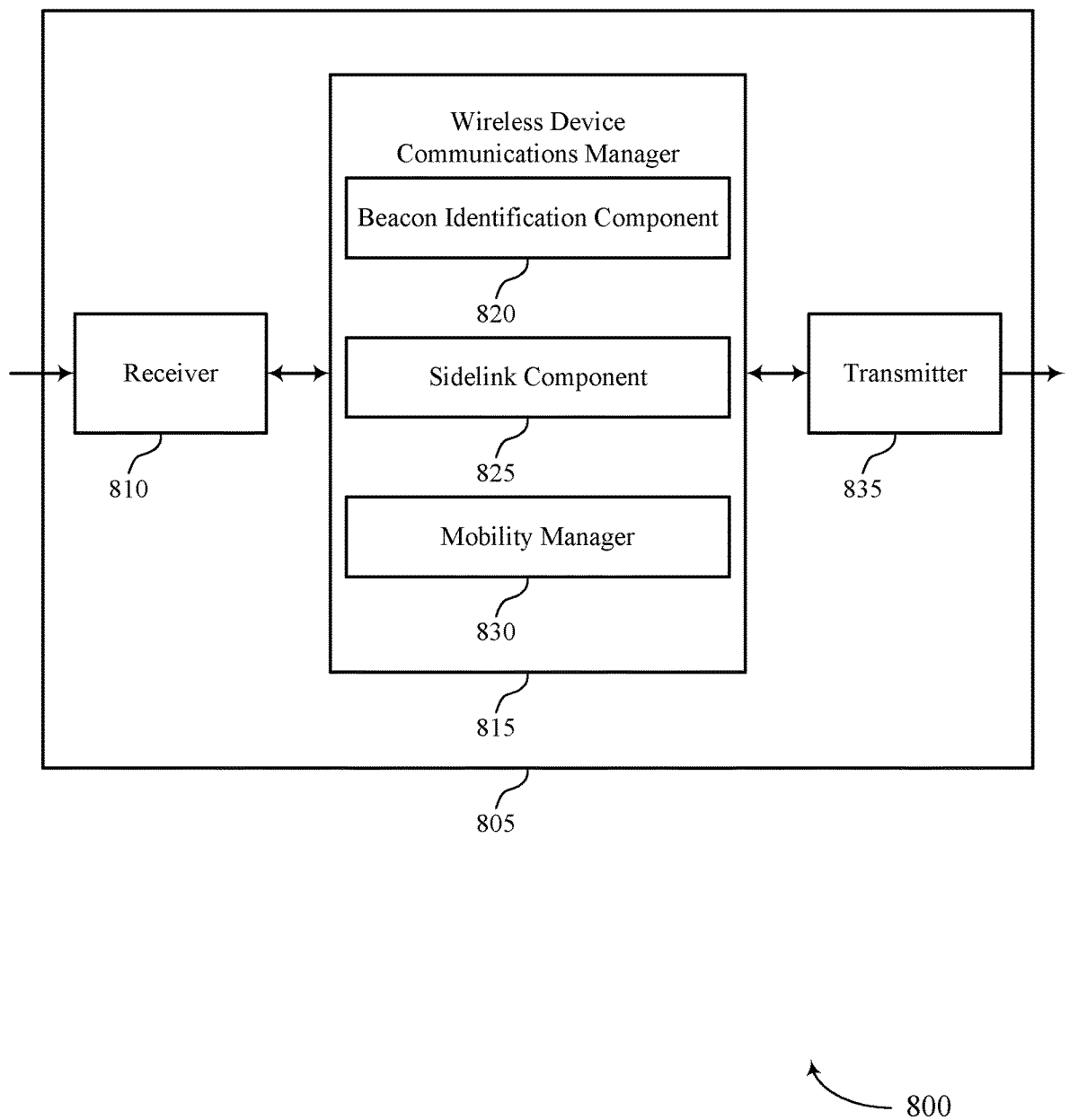

FIG. 8 shows a block diagram 800 of a device 805 in accordance with aspects of the present disclosure. The device 805 may be an example of aspects of a device 705, an on board module, or a UE 115 as described herein. The device 805 may include a receiver 810, a wireless device communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to bike lane communications networks, etc.). Information may be passed on to other components of the device 805. The receiver 810 may be an example of aspects of the transceiver 1220 described with reference to FIG. 12. The receiver 810 may utilize a single antenna or a set of antennas.

The wireless device communications manager 815 may be an example of aspects of the wireless device communications manager 715 as described herein. The wireless device communications manager 815 may include a beacon identification component 820, a sidelink component 825, and a mobility manager 830. The wireless device communications manager 815 may be an example of aspects of the wireless device communications manager 1210 described herein.

The beacon identification component 820 may identify a set of beacon devices. The sidelink component 825 may receive, over a sidelink communications link, one or more messages from each beacon device of the set of beacon devices. The mobility manager 830 may determine a mobility state of the wireless device based on the received one or more messages, the mobility state including a location of the wireless device, a speed of the wireless device, or a combination thereof.

The transmitter 835 may transmit signals generated by other components of the device 805. In some examples, the transmitter 835 may be collocated with a receiver 810 in a transceiver module. For example, the transmitter 835 may be an example of aspects of the transceiver 1220 described with reference to FIG. 12. The transmitter 835 may utilize a single antenna or a set of antennas.

Figure 9:
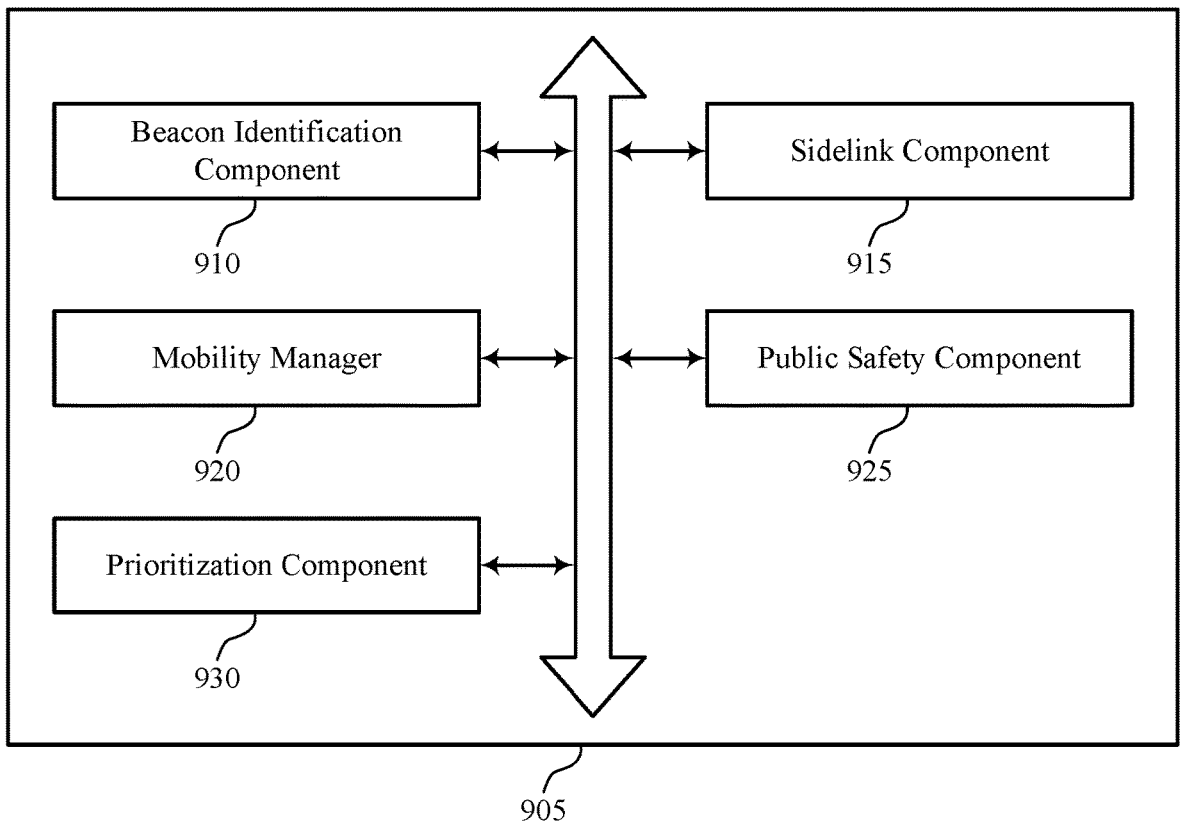
FIG. 9 shows a block diagram of a wireless device communications manager in accordance with aspects of the present disclosure.

FIG. 9 shows a block diagram 900 of a wireless device communications manager 905 in accordance with aspects of the present disclosure. The wireless device communications manager 905 may be an example of aspects of a wireless device communications manager 715, a wireless device communications manager 815, or a wireless device communications manager 1210 described herein. The wireless device communications manager 905 may include a beacon identification component 910, a sidelink component 915, a mobility manager 920, a public safety component 925, and a prioritization component 930. Each of these modules may communicate, directly or indirectly, with one another (e.g., via one or more buses).

The beacon identification component 910 may identify a set of beacon devices. In some cases, each beacon device of the set of beacon devices include a road side beacon for a bike lane. The sidelink component 915 may receive, over a sidelink communications link, one or more messages from each beacon device of the set of beacon devices.

In some examples, the sidelink component 915 may receive a beacon device identifier within each of the one or more messages, where the mobility state is determined based on the beacon device identifier of the one or more messages. In some examples, the sidelink component 915 may receive public safety information within a payload of a first message of the one or more messages. In some examples, the sidelink component 915 may receive a second message from a second wireless device, a payload of the second message including public safety information, navigation information, hazard information, or a combination thereof.

In some examples, the sidelink component 915 may transmit a third message to one or more other wireless devices based on the received one or more messages, the received second message, or a combination thereof. In some examples, the sidelink component 915 may transmit the third message using a first set of time and frequency resources, a payload of the third message including an indication of the public safety information. In some examples, the sidelink component 915 may transmit the third message using a second set of time and frequency resources, a payload of the third message including an indication of the navigation information, the hazard information, or a combination thereof.

In some examples, the sidelink component 915 may receive the one or more messages via an unlicensed radio frequency spectrum band over the sidelink communications link. In some examples, the sidelink component 915 may receive the one or more messages via a licensed radio frequency spectrum band over the sidelink communications link, where each of the one or more messages are received on a set of configured resources, a set of predefined resources, or a combination thereof.

In some cases, each beacon device identifier corresponds to a respective beacon device of the set of beacon devices that transmitted a message of the one or more messages. In some cases, a payload of the third message includes an indication of the public safety information, the navigation information, the hazard information, location information, or a combination thereof. In some cases, the wireless device includes a user equipment, an on board module of a bicycle, or any combination thereof.

The mobility manager 920 may determine a mobility state of the wireless device based on the received one or more messages, the mobility state including a location of the wireless device, a speed of the wireless device, or a combination thereof. In some examples, the mobility manager 920 may determine a mobility status of the wireless device based on the received one or more messages. In some examples, the mobility manager 920 may transmit, to a base station, an indication of the mobility status.

In some cases, the mobility status includes a cyclist status. The public safety component 925 may identify a public safety warning type indicated by the public safety information. In some examples, the public safety component 925 may receive an indication of an emergency event. In some examples, the public safety component 925 may communicate with one or more temporary nodes based on the received indication. In some cases, the one or more temporary nodes form a mobile hotspot, a mesh network, or any combination thereof.

The prioritization component 930 may prioritize the first message over other messages received at the wireless device based on the public safety information within the payload of the first message. In some examples, the prioritization component 930 may refrain from transmitting to other wireless devices based on the public safety information. In some examples, the prioritization component 930 may discard a set of messages received by the wireless device.

Figure 10:
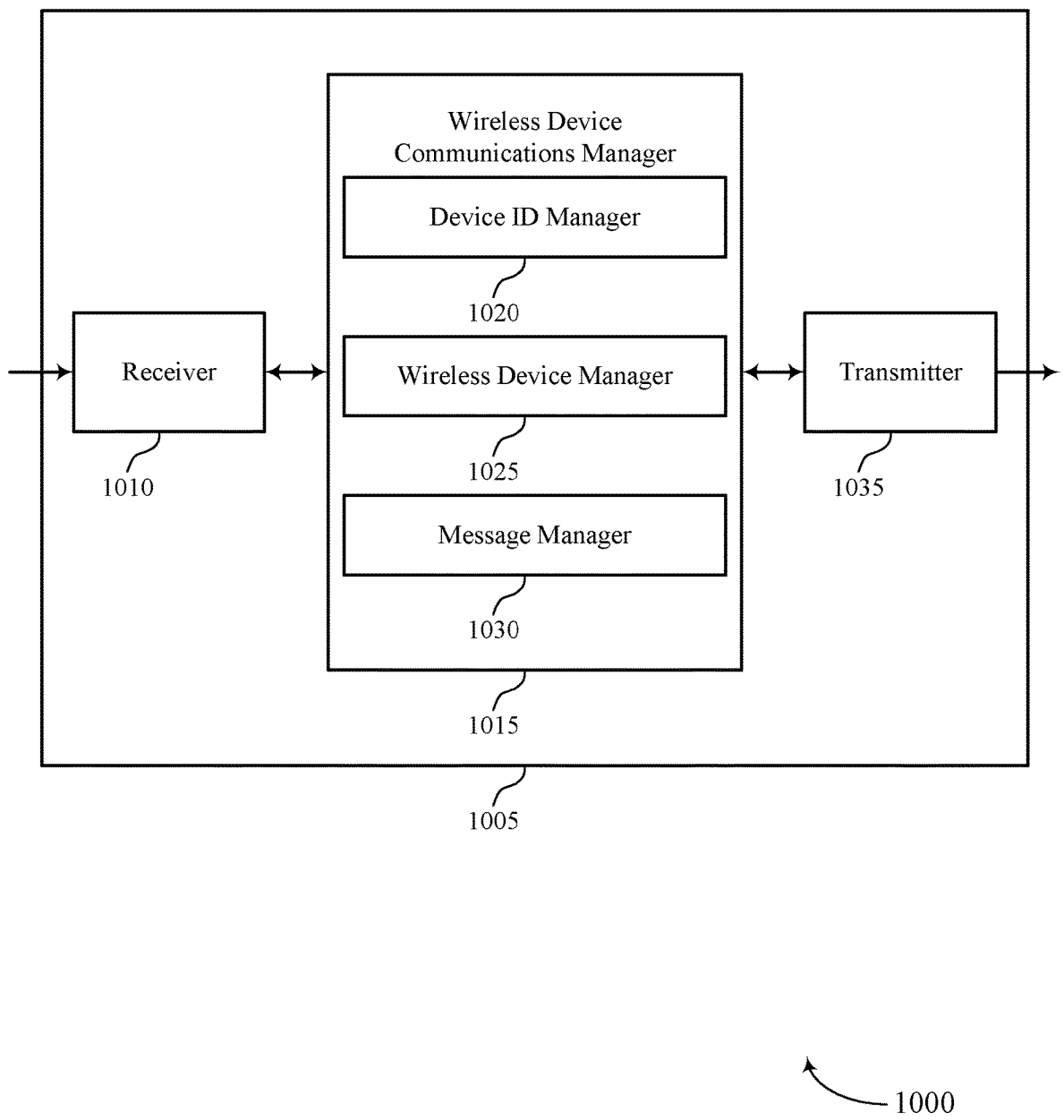
FIG. 10 shows a block diagrams of a device in accordance with aspects of the present disclosure.

FIG. 10 shows a block diagram 1000 of a device 1005 in accordance with aspects of the present disclosure. The device 1005 may be an example of aspects of a device 705, a UE 115, or a road side beacon, as described herein. The device 1005 may include a receiver 1010, a wireless device communications manager 1015, and a transmitter 1035. The device 1005 may also include a processor. Each of these components may be in communication with one another (e.g., via one or more buses).

Receiver 1010 may receive information such as packets, user data, or control information associated with various information channels (e.g., control channels, data channels, and information related to bike lane communications networks, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The wireless device communications manager 1015 may be an example of aspects of the wireless device communications manager 715 as described herein. The wireless device communications manager 1015 may include a device ID manager 1020, a wireless device manager 1025, and a message manager 1030. The wireless device communications manager 1015 may be an example of aspects of the wireless device communications manager 1210 or 1310 as described herein.

The device ID manager 1020 may determine an identifier corresponding to the wireless device. The wireless device manager 1025 may identify one or more other wireless devices. The message manager 1030 may transmit, over a sidelink communications link, one or more messages to the one or more other wireless devices, each of the one or more messages including an indication of the identifier, where the identifier is used for determining a mobility state including a location, a speed, or a combination thereof.

Transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 or 1320 as described with reference to FIGS. 12 and 13. The transmitter 1035 may utilize a single antenna or a set of antennas.

Figure 11:
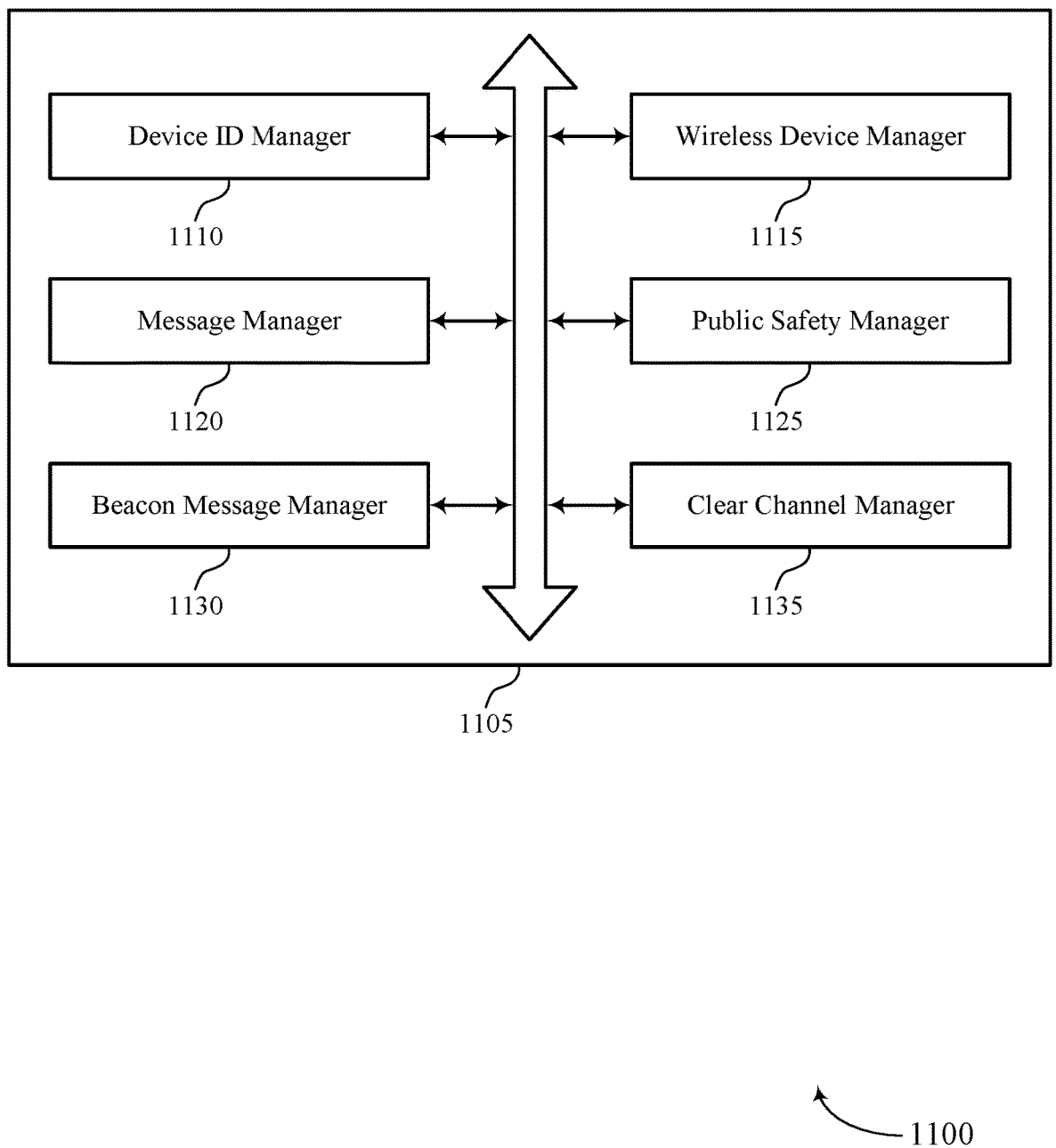
FIG. 11 shows a block diagram of a wireless device communications manager in accordance with aspects of the present disclosure.

FIG. 11 shows a block diagram 1100 of a wireless device communications manager 1105 in accordance with aspects of the present disclosure. The wireless device communications manager 1105 may be an example of aspects of a wireless device communications manager 715, a wireless device communications manager 1015, a wireless device communications manager 1210, or a wireless device communications manager 1310 described herein. The wireless device communications manager 1105 may include a device ID manager 1110, a wireless device manager 1115, a message manager 1120, a public safety manager 1125, a beacon message manager 1130, and a clear channel manager 1135. Each of these modules may communicate, directly or indirectly, with one another (e.g., via one or more buses).

The device ID manager 1110 may determine an identifier corresponding to the wireless device. The wireless device manager 1115 may identify one or more other wireless devices. The message manager 1120 may transmit, over a sidelink communications link, one or more messages to the one or more other wireless devices, each of the one or more messages including an indication of the identifier, where the identifier is used for determining a mobility state including a location, a speed, or a combination thereof.

In some examples, the message manager 1120 may transmit the first message using a first set of time and frequency resources, a payload of the first message including an indication of the public safety information. In some examples, the message manager 1120 may transmit the first message using a second set of time and frequency resources, a payload of the first message including an indication of the navigation information, the hazard information, or a combination thereof.

In some examples, the message manager 1120 may transmit the one or more messages via the unlicensed radio frequency spectrum band over the sidelink communications link based on determining that the unlicensed radio frequency spectrum band is available. In some examples, the message manager 1120 may identify a set of resources within a licensed radio frequency spectrum band for transmitting the one or more messages.

In some examples, the message manager 1120 may transmit the one or more messages via the set of resources over the sidelink communications link, where the set of resources include resources scheduled by a base station, predefined resources, or a combination thereof. In some cases, a payload of a first message of the one or more messages includes an indication of public safety information, navigation information, hazard information, or a combination thereof.

The public safety manager 1125 may identify a public safety warning type associated with an event. In some examples, the public safety manager 1125 may receive an indication to transmit the public safety information within the payload, where the indication is triggered in accordance with a network configuration, or via a user input, or a combination thereof. In some examples, transmitting, to one or more temporary nodes, an emergency signal indicating an event associated with the one or more other wireless devices, where the emergency signal includes location information associated with the event. In some cases, the one or more temporary nodes form a mobile hotspot, a mesh network, or any combination thereof.

The beacon message manager 1130 may transmit, within a payload of each of the one or more messages, public safety information indicating the public safety warning type. The clear channel manager 1135 may perform a clear channel assessment for an unlicensed radio frequency spectrum band. In some examples, the clear channel manager 1135 may determine whether the unlicensed radio frequency spectrum band is available based on the clear channel assessment.

Figure 12:
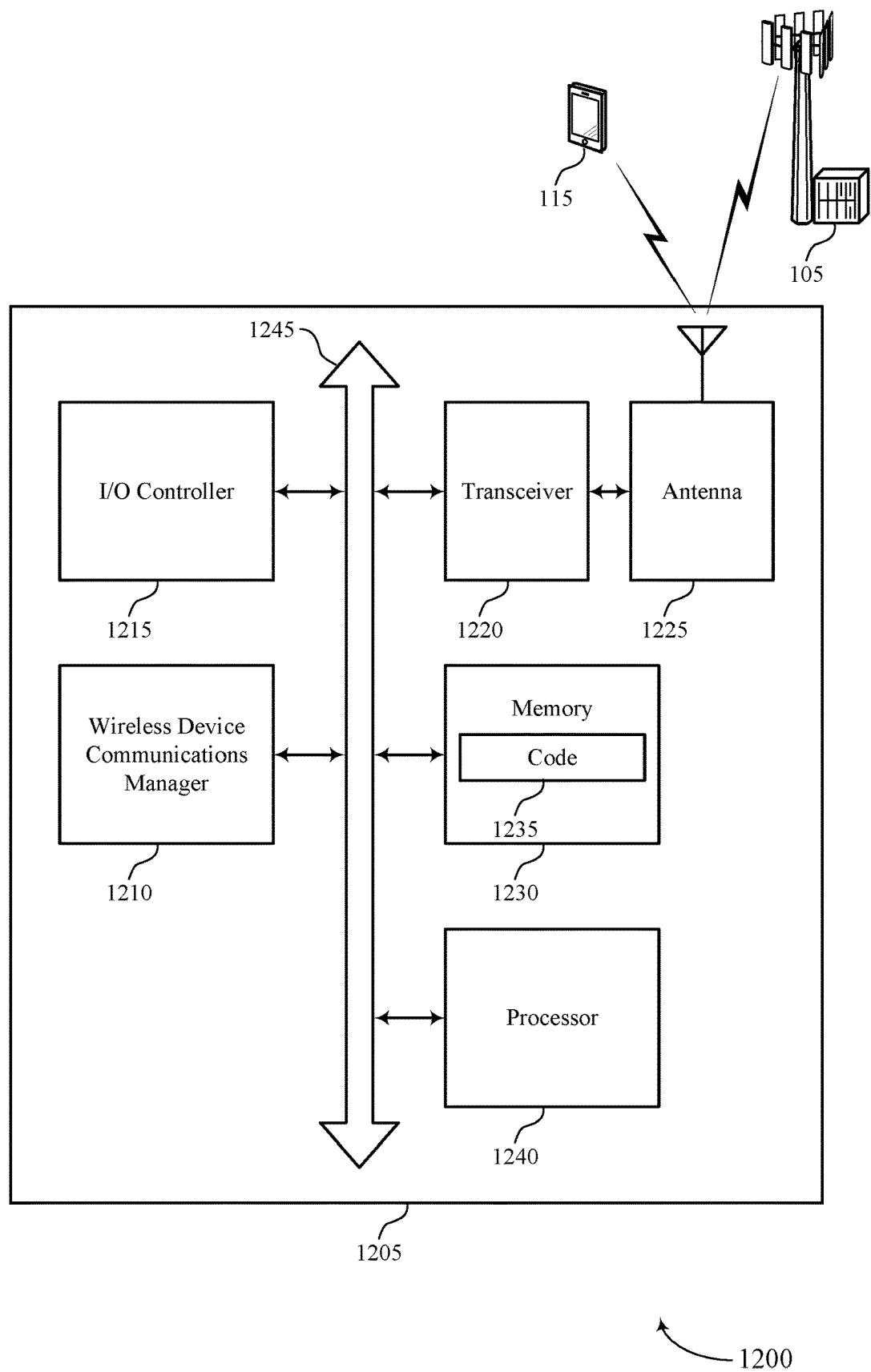
FIGS. 12 and 13 show diagrams of systems including a wireless device in accordance with aspects of the present disclosure.

FIG. 12 shows a diagram of a system 1200 including a device 1205 in accordance with aspects of the present disclosure. The device 1205 may be an example of or include the components of device 705, device 1005, an on board module, a UE 115, or a road side beacon, as described herein. The device 1205 may include components for bi-directional voice and data communications including components for transmitting and receiving communications, including a wireless device communications manager 1210, a transceiver 1220, an antenna 1225, memory 1230, a processor 1240, and an I/O controller 1215. These components may be in electronic communication via one or more buses (e.g., bus 1245).

The wireless device communications manager 1210 may identify a set of beacon devices, receive, over a sidelink communications link, one or more messages from each beacon device of the set of beacon devices, and determine a mobility state of the wireless device based on the received one or more messages, the mobility state including a location of the wireless device, a speed of the wireless device, or a combination thereof.

In some examples, the wireless device communications manager 1210 may determine an identifier corresponding to the wireless device, identify one or more other wireless devices, and transmit, over a sidelink communications link, one or more messages to the one or more other wireless devices, each of the one or more messages including an indication of the identifier, where the identifier is used for determining a mobility state including a location, a speed, or a combination thereof.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a digital signal processor (DSP), a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting bike lane communications networks).

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Based on the use of sidelink communications for tracking and calculation of a wireless device's speed, data transmitted by devices may not need to go through a base station, which may also reduce latency in communications (e.g., through direct transmissions between devices). As such a processor of the wireless device (e.g., controlling a receiver, a transmitter, or the transceiver 1220) may efficiently communicate information, such as public safety information or emergency information, with reduced latency and reliability.

Figure 13:
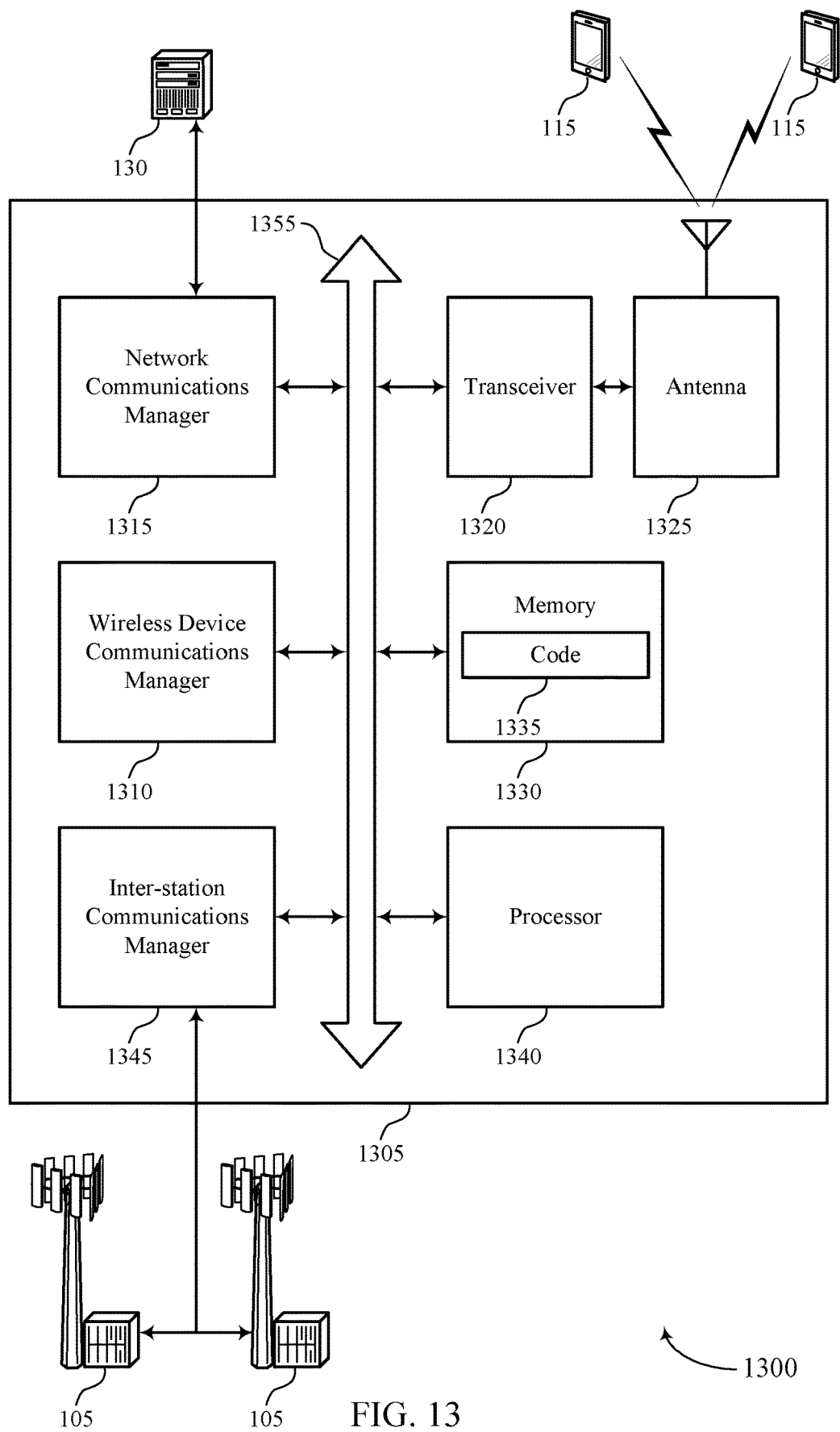

FIG. 13 shows a diagram of a system 1300 including a device 1305 in accordance with aspects of the present disclosure. The device 1305 may be an example of or include the components of device 1005, or a road side beacon as described herein. The device 1305 may include components for bi-directional voice and data communications including components for transmitting and receiving communications, including a wireless device communications manager 1310, a network communications manager 1350, a transceiver 1320, an antenna 1325, memory 1330, a processor 1340, and an inter-station communications manager 1355. These components may be in electronic communication via one or more buses (e.g., bus 1345).

The wireless device communications manager 1310 may determine an identifier corresponding to the wireless device, identify one or more other wireless devices, and transmit, over a sidelink communications link, one or more messages to the one or more other wireless devices, each of the one or more messages including an indication of the identifier, where the identifier is used for determining a mobility state including a location, a speed, or a combination thereof.

Network wireless device communications manager 1350 may manage communications with the core network (e.g., via one or more wired backhaul links). For example, the network wireless device communications manager 1350 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting bike lane communications networks).

Inter-station wireless device communications manager 1355 may manage communications with other base stations 105, and may include a controller or scheduler for controlling communications with UEs 115 in cooperation with other base stations 105. For example, the inter-station wireless device communications manager 1355 may coordinate scheduling for transmissions to UEs 115 for various interference mitigation techniques such as beamforming or joint transmission. In some examples, inter-station wireless device communications manager 1355 may provide an X2 interface within an LTE/LTE-A or NR wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
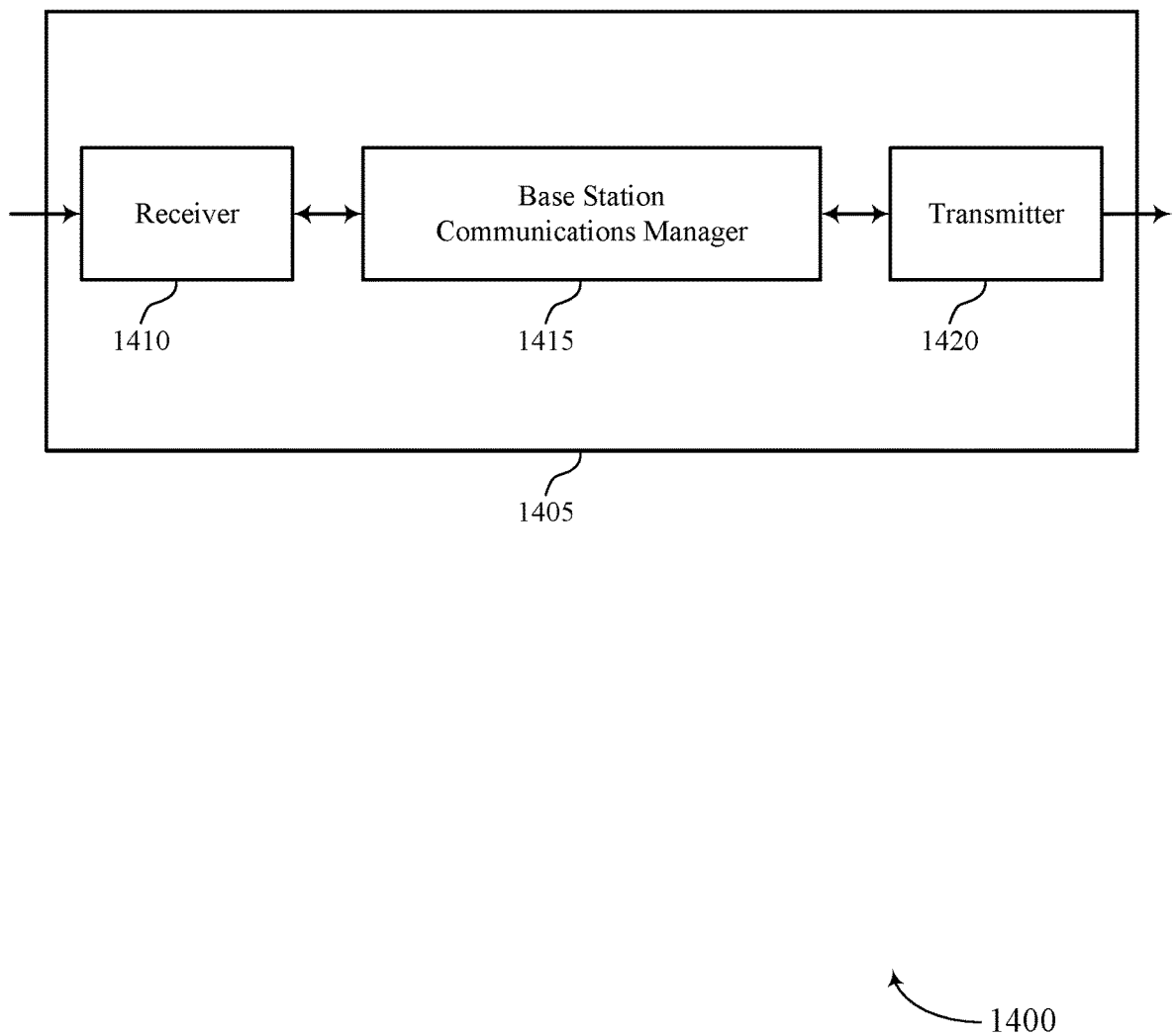
FIGS. 14 and 15 show block diagrams of devices in accordance with aspects of the present disclosure.

FIG. 14 shows a block diagram 1400 of a device 1405 in accordance with aspects of the present disclosure. The device 1405 may be an example of aspects of a base station 105 as described herein. The device 1405 may include a receiver 1410, a base station communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to bike lane communications networks, etc.). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may receive, from a UE, an indication of a mobility status of the UE, receive two or more measurement reports from the UE, and determine an association between the two or more measurement reports based on the mobility status. The base station communications manager 1415 may be an example of aspects of the base station communications manager 1710 described herein.

The base station communications manager 1415 may also receive, from a first wireless device, an indication of a type of a second wireless device that is located at a first location, determine that the second wireless device is prohibited from the first location based on the type of the second wireless device and the received indication, and transmit a message that indicates the second wireless device is prohibited from the first location.

The base station communications manager 1415, or its sub-components, may be implemented in hardware, code (e.g., software or firmware) executed by a processor, or any combination thereof. If implemented in code executed by a processor, the functions of the base station communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1415, or its sub-components, may be physically located at various positions, including being distributed such that portions of functions are implemented at different physical locations by one or more physical components. In some examples, the base station communications manager 1415, or its sub-components, may be a separate and distinct component in accordance with various aspects of the present disclosure. In some examples, the base station communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
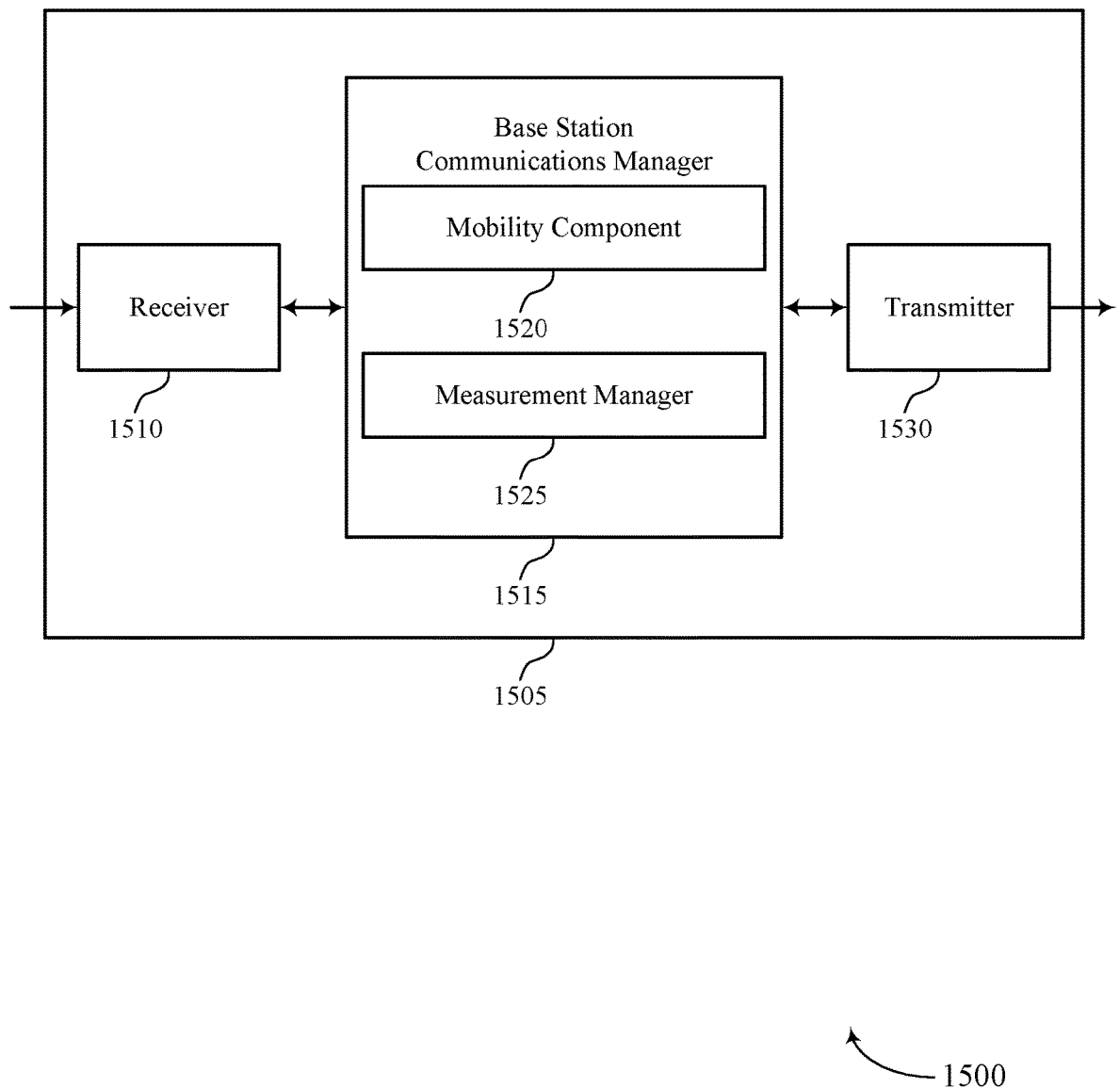

FIG. 15 shows a block diagram 1500 of a device 1505 in accordance with aspects of the present disclosure. The device 1505 may be an example of aspects of a device 1405, or a base station 105 as described herein. The device 1505 may include a receiver 1510, a base station communications manager 1515, and a transmitter 1530. The device 1505 may also include a processor. Each of these components may be in communication with one another (e.g., via one or more buses).

The receiver 1510 may receive information such as packets, user data, or control information associated with various information channels (e.g., control channels, data channels, and information related to bike lane communications networks, etc.). Information may be passed on to other components of the device 1505. The receiver 1510 may be an example of aspects of the transceiver 1720 described with reference to FIG. 17. The receiver 1510 may utilize a single antenna or a set of antennas.

The base station communications manager 1515 may be an example of aspects of the base station communications manager 1415 as described herein. The base station communications manager 1515 may include a mobility component 1520 and a measurement manager 1525. The base station communications manager 1515 may be an example of aspects of the base station communications manager 1710 described herein.

The mobility component 1520 may receive, from a UE, an indication of a mobility status of the UE.

The measurement manager 1525 may receive two or more measurement reports from the UE and determine an association between the two or more measurement reports based on the mobility status.

The transmitter 1530 may transmit signals generated by other components of the device 1505. In some examples, the transmitter 1530 may be collocated with a receiver 1510 in a transceiver module. For example, the transmitter 1530 may be an example of aspects of the transceiver 1720 described with reference to FIG. 17. The transmitter 1530 may utilize a single antenna or a set of antennas.

Figure 16:
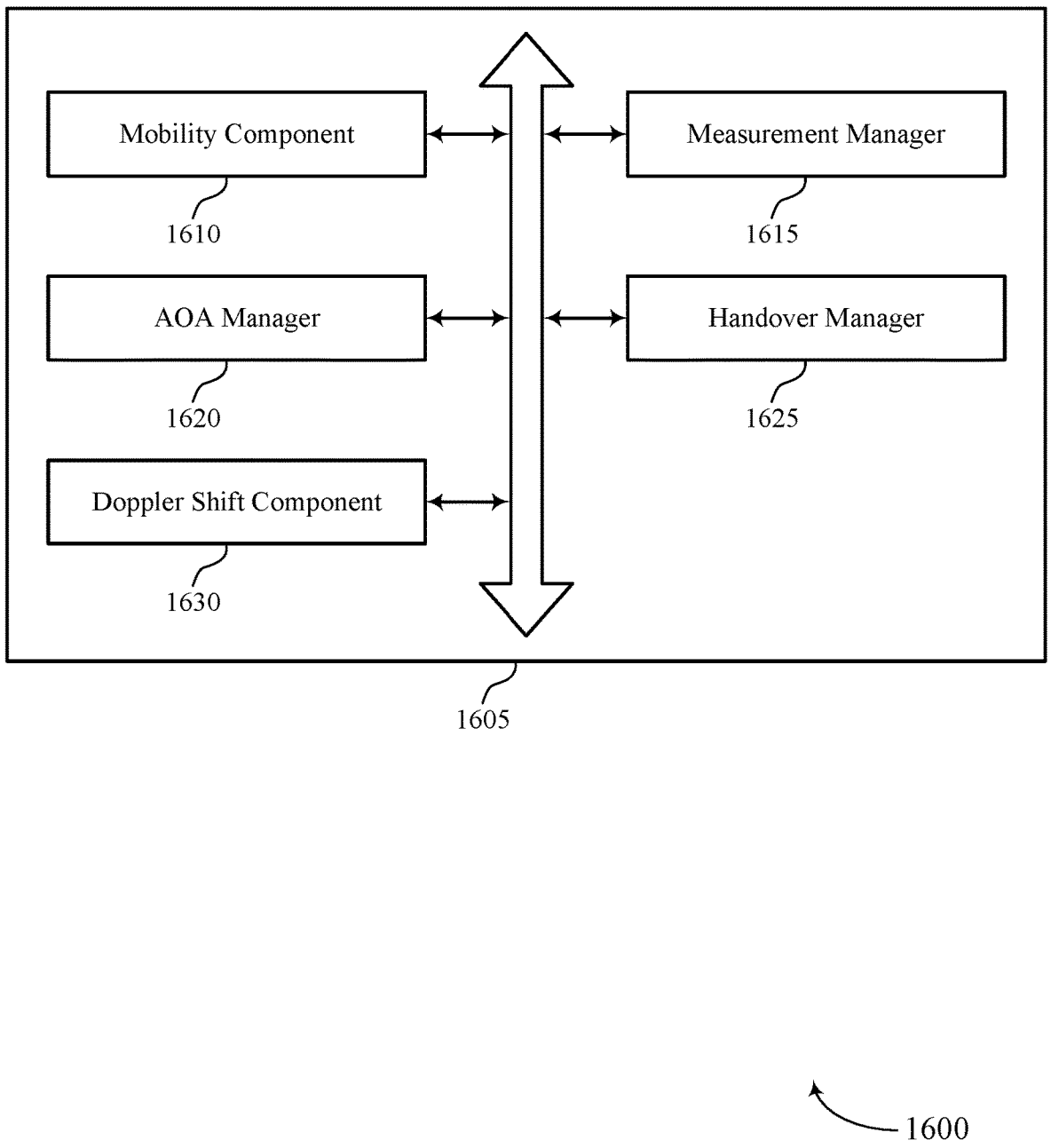
FIG. 16 shows a block diagram of a base station communications manager in accordance with aspects of the present disclosure.

FIG. 16 shows a block diagram 1600 of a base station communications manager 1605 in accordance with aspects of the present disclosure. The base station communications manager 1605 may be an example of aspects of a base station communications manager 1415, a base station communications manager 1515, or a base station communications manager 1710 described herein. The base station communications manager 1605 may include a mobility component 1610, a measurement manager 1615, an AOA manager 1620, a handover manager 1625, and a doppler shift component 1630. Each of these modules may communicate, directly or indirectly, with one another (e.g., via one or more buses).

The mobility component 1610 may receive, from a UE, an indication of a mobility status of the UE. In some cases, the mobility status includes a cyclist status. In some examples, the mobility component 1610 may receive, from a first wireless device (e.g., a road side beacon), an indication of a type of a second wireless device (e.g., a motor bike) that is located at a first location (e.g., on a bike lane). In some examples, the mobility component 1610 may determine that the second wireless device is prohibited from the first location based on the type of the second wireless device and the received indication. In some examples, the mobility component 1610 may transmit a message that indicates the second wireless device is prohibited from the first location.

The measurement manager 1615 may receive two or more measurement reports from the UE. In some examples, the measurement manager 1615 may determine an association between the two or more measurement reports based on the mobility status.

In some examples, the measurement manager 1615 may determine a first difference between each of the two or more measurement reports based on the mobility status. In some examples, the measurement manager 1615 may tune a result of the two or more measurement reports using the first difference based on the association between the two or more measurement reports. In some examples, the measurement manager 1615 may predict one or more additional measurement reports from the UE based on the first difference and the second difference.

In some examples, the measurement manager 1615 may adjust a measurement threshold associated with measurement reports received from the UE based on the predicted one or more measurement reports. In some examples, the measurement manager 1615 may predict a measurement value based on the association between the two or more measurement reports.

The AOA manager 1620 may determine a second difference between a first angle of arrival for receiving a first directional communication from the UE and a second angle of arrival for receiving a second directional communication from the UE based on the mobility status, where the first difference and the second difference are based on the received two or more measurement reports.

The handover manager 1625 may adjust a set of handover parameters for handing over the UE to a target base station based on the mobility status. In some examples, the handover manager 1625 may adjust a timer for handing over the UE to the target base station based on the predicted one or more measurement reports. In some examples, the handover manager 1625 may initiate a handover of the UE to a target base station based on the predicted measurement value, where the handover of the UE occurs prior to a predetermined handover time.

The Doppler shift component 1630 may determine a doppler shift associated with communications with the UE based on a speed and direction of the UE, where the mobility status is indicative of the speed and direction of the UE.

Figure 17:
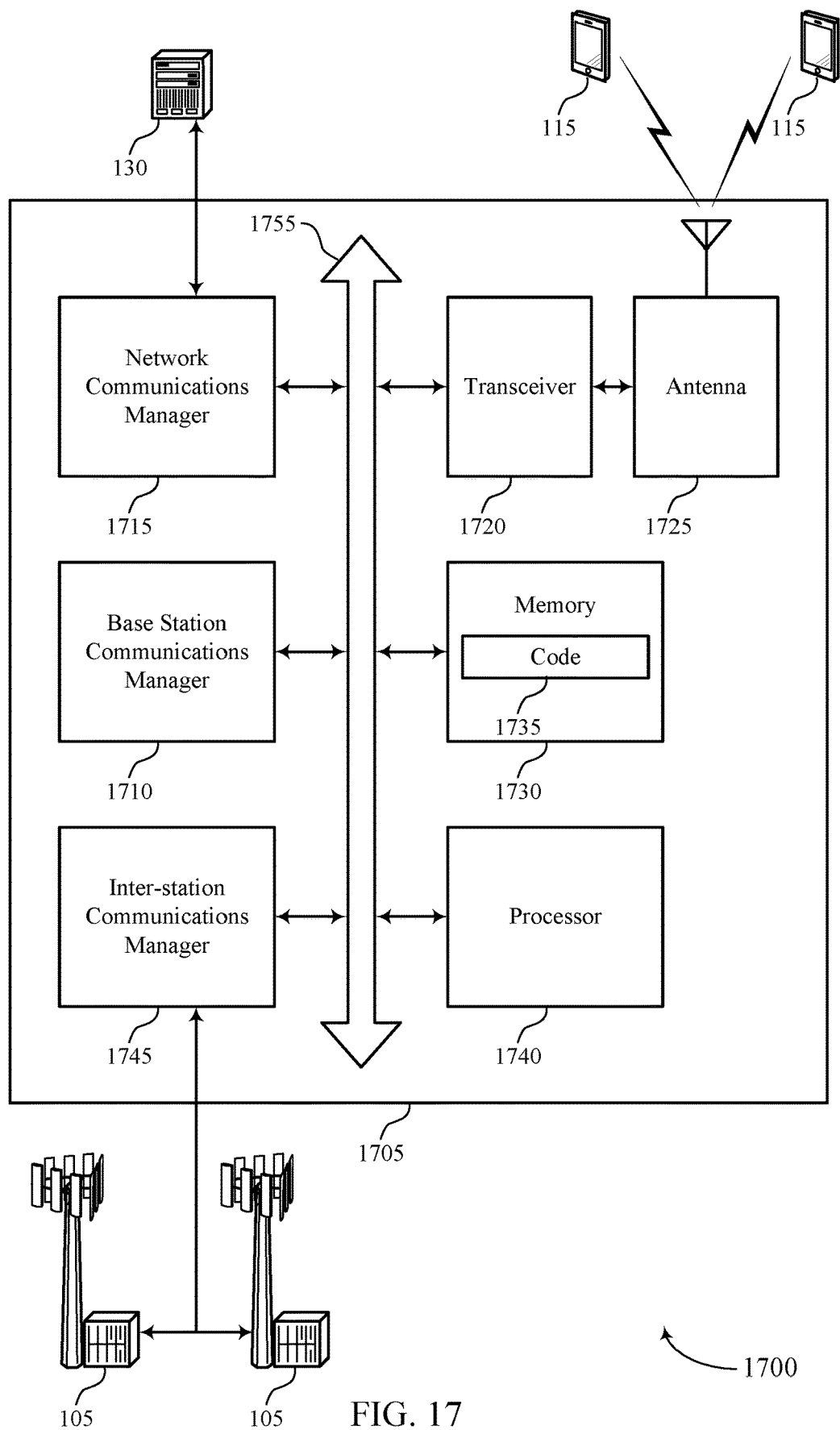
FIG. 17 shows a diagram of a system including a device in accordance with aspects of the present disclosure.

FIG. 17 shows a diagram of a system 1700 including a device 1705 that supports bike lane communications networks in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a base station communications manager 1710, a network communications manager 1715, a transceiver 1720, an antenna 1725, memory 1730, a processor 1740, and an inter-station communications manager 1745. These components may be in electronic communication via one or more buses (e.g., bus 1755).

The base station communications manager 1710 may receive, from a UE, an indication of a mobility status of the UE, receive two or more measurement reports from the UE, and determine an association between the two or more measurement reports based on the mobility status.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas. In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting bike lane communications networks).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
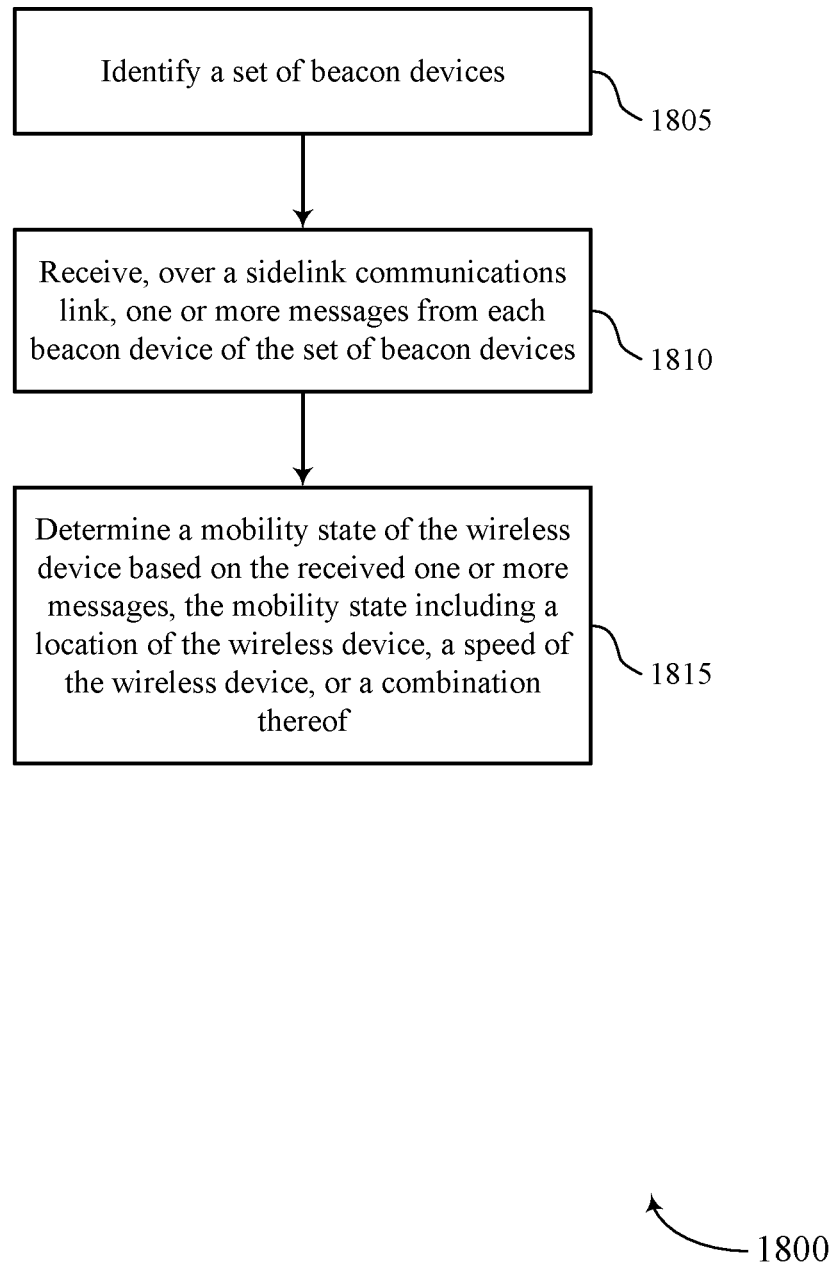
FIGS. 18 through 22 show flowcharts illustrating methods in accordance with aspects of the present disclosure.

FIG. 18 shows a flowchart illustrating a method 1800 that supports bike lane communications networks in accordance with aspects of the present disclosure. The operations of method 1800 may be implemented by a wireless device (such as a UE 115, an on board module, or other wireless device) or its components as described herein. For example, the operations of method 1800 may be performed by a wireless device communications manager as described with reference to FIGS. 7 through 12. In some examples, a wireless device may execute a set of instructions to control the functional elements of the wireless device to perform the functions described below. Additionally or alternatively, a wireless device may perform aspects of the functions described below using special-purpose hardware.

At 1805, the wireless device may identify a set of beacon devices. The operations of 1805 may be performed according to the methods described herein. In some examples, aspects of the operations of 1805 may be performed by a beacon identification component as described with reference to FIGS. 7 through 12.

At 1810, the wireless device may receive, over a sidelink communications link, one or more messages from each beacon device of the set of beacon devices. The operations of 1810 may be performed according to the methods described herein. In some examples, aspects of the operations of 1810 may be performed by a sidelink component as described with reference to FIGS. 7 through 12.

At 1815, the wireless device may determine a mobility state of the wireless device based on the received one or more messages, the mobility state including a location of the wireless device, a speed of the wireless device, or a combination thereof. The operations of 1815 may be performed according to the methods described herein. In some examples, aspects of the operations of 1815 may be performed by a mobility manager as described with reference to FIGS. 7 through 12.

Figure 19:
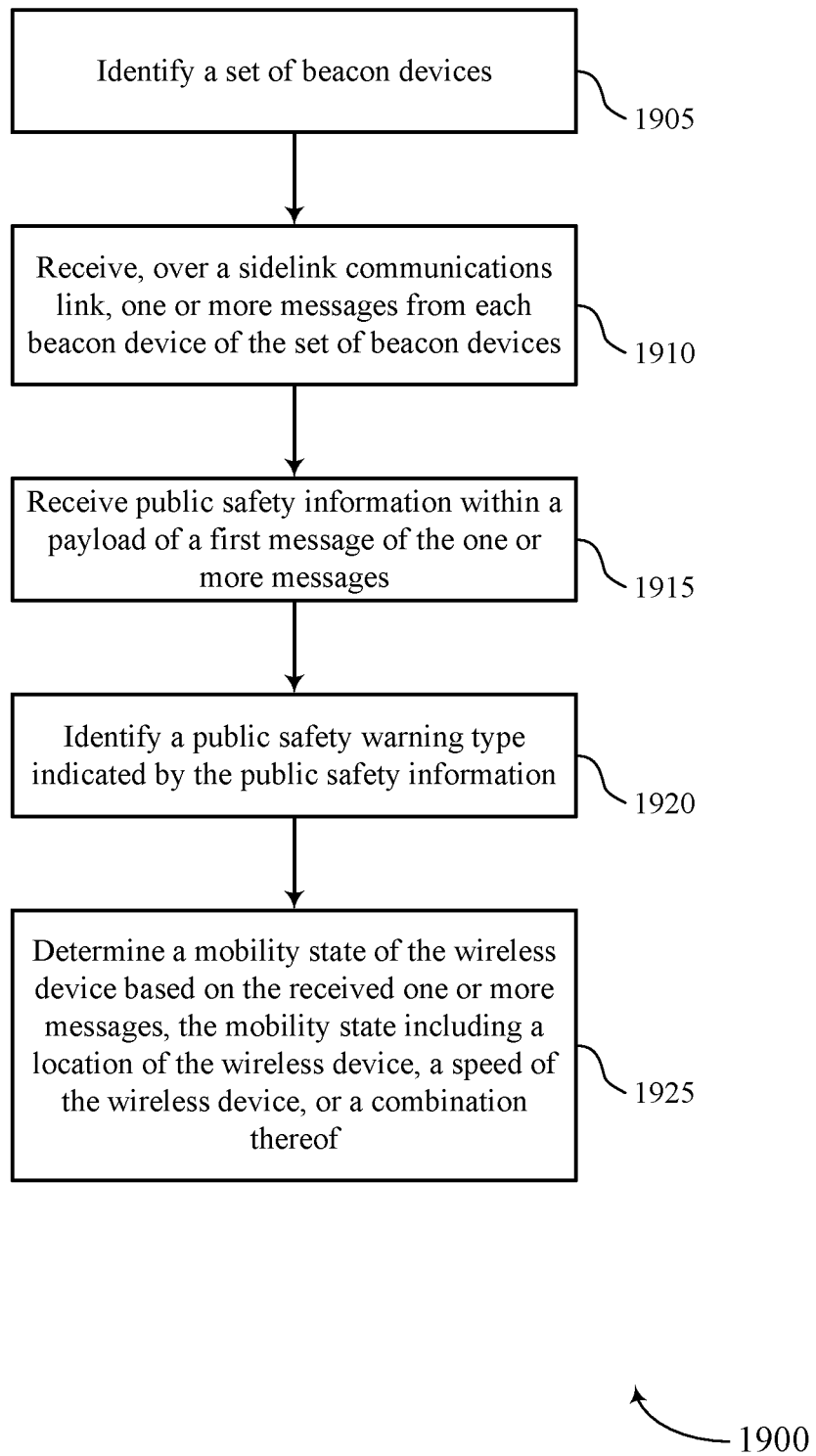

FIG. 19 shows a flowchart illustrating a method 1900 that supports bike lane communications networks in accordance with aspects of the present disclosure. The operations of method 1900 may be implemented by a wireless device (such as a UE 115, an on board module, or other wireless device) or its components as described herein. For example, the operations of method 1900 may be performed by a wireless device communications manager as described with reference to FIGS. 7 through 12. In some examples, a wireless device may execute a set of instructions to control the functional elements of the wireless device to perform the functions described below. Additionally or alternatively, a wireless device may perform aspects of the functions described below using special-purpose hardware.

At 1905, the wireless device may identify a set of beacon devices. The operations of 1905 may be performed according to the methods described herein. In some examples, aspects of the operations of 1905 may be performed by a beacon identification component as described with reference to FIGS. 7 through 12.

At 1910, the wireless device may receive, over a sidelink communications link, one or more messages from each beacon device of the set of beacon devices. The operations of 1910 may be performed according to the methods described herein. In some examples, aspects of the operations of 1910 may be performed by a sidelink component as described with reference to FIGS. 7 through 12.

At 1915, the wireless device may receive public safety information within a payload of a first message of the one or more messages. The operations of 1915 may be performed according to the methods described herein. In some examples, aspects of the operations of 1915 may be performed by a sidelink component as described with reference to FIGS. 7 through 12.

At 1920, the wireless device may identify a public safety warning type indicated by the public safety information. The operations of 1920 may be performed according to the methods described herein. In some examples, aspects of the operations of 1920 may be performed by a public safety component as described with reference to FIGS. 7 through 12.

At 1925, the wireless device may determine a mobility state of the wireless device based on the received one or more messages, the mobility state including a location of the wireless device, a speed of the wireless device, or a combination thereof. The operations of 1925 may be performed according to the methods described herein. In some examples, aspects of the operations of 1925 may be performed by a mobility manager as described with reference to FIGS. 7 through 12.

Figure 20:
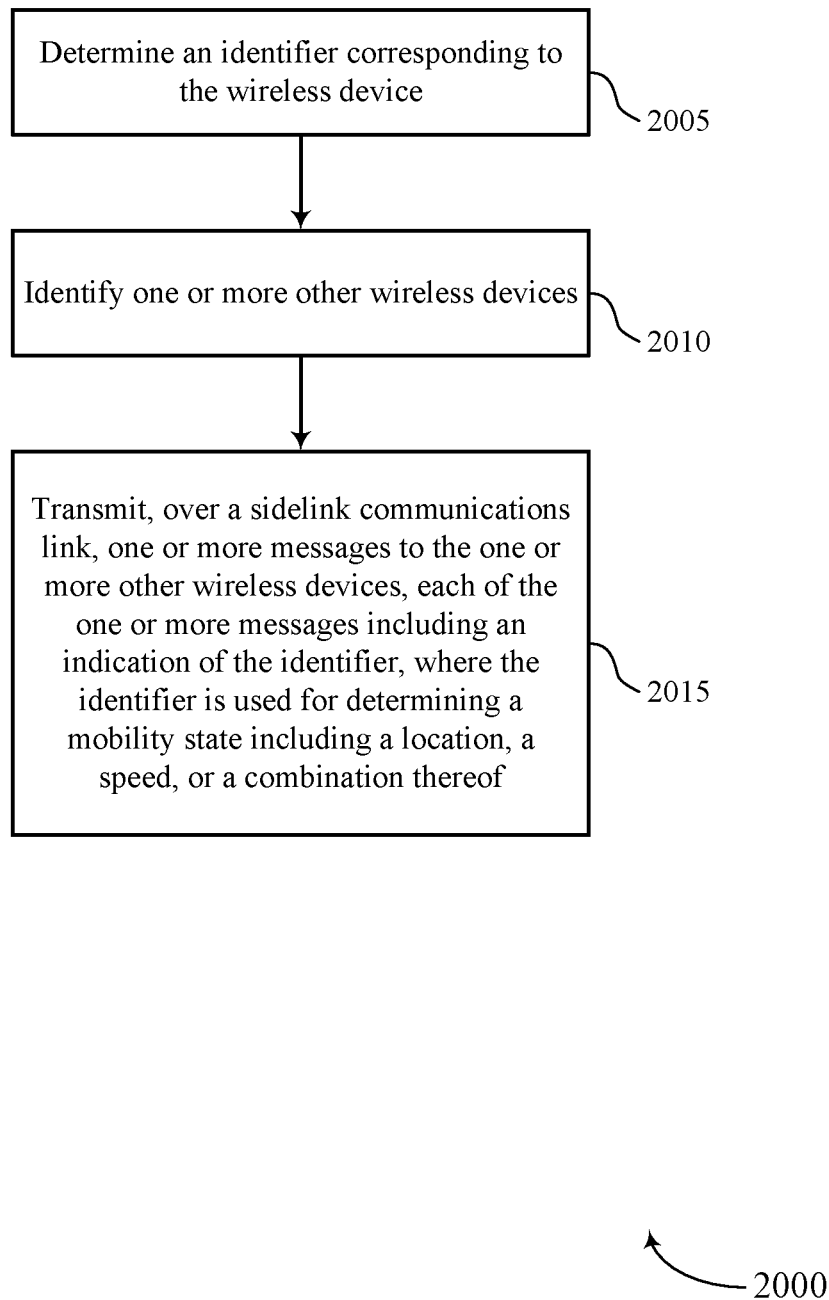

FIG. 20 shows a flowchart illustrating a method 2000 that supports bike lane communications networks in accordance with aspects of the present disclosure. The operations of method 2000 may be implemented by a wireless device (such as a UE 115, a beacon device (e.g., a road side beacon), or other wireless device) or its components as described herein. For example, the operations of method 2000 may be performed by a wireless device communications manager as described with reference to FIGS. 10 through 13. In some examples, a wireless device may execute a set of instructions to control the functional elements of the wireless device to perform the functions described below. Additionally or alternatively, a wireless device may perform aspects of the functions described below using special-purpose hardware.

At 2005, the wireless device may determine an identifier corresponding to the wireless device. The operations of 2005 may be performed according to the methods described herein. In some examples, aspects of the operations of 2005 may be performed by a device ID manager as described with reference to FIGS. 10 through 13.

At 2010, the wireless device may identify one or more other wireless devices. The operations of 2010 may be performed according to the methods described herein. In some examples, aspects of the operations of 2010 may be performed by a wireless device manager as described with reference to FIGS. 10 through 13.

At 2015, the wireless device may transmit, over a sidelink communications link, one or more messages to the one or more other wireless devices, each of the one or more messages including an indication of the identifier, where the identifier is used for determining a mobility state including a location, a speed, or a combination thereof. The operations of 2015 may be performed according to the methods described herein. In some examples, aspects of the operations of 2015 may be performed by a message manager as described with reference to FIGS. 10 through 13.

Figure 21:
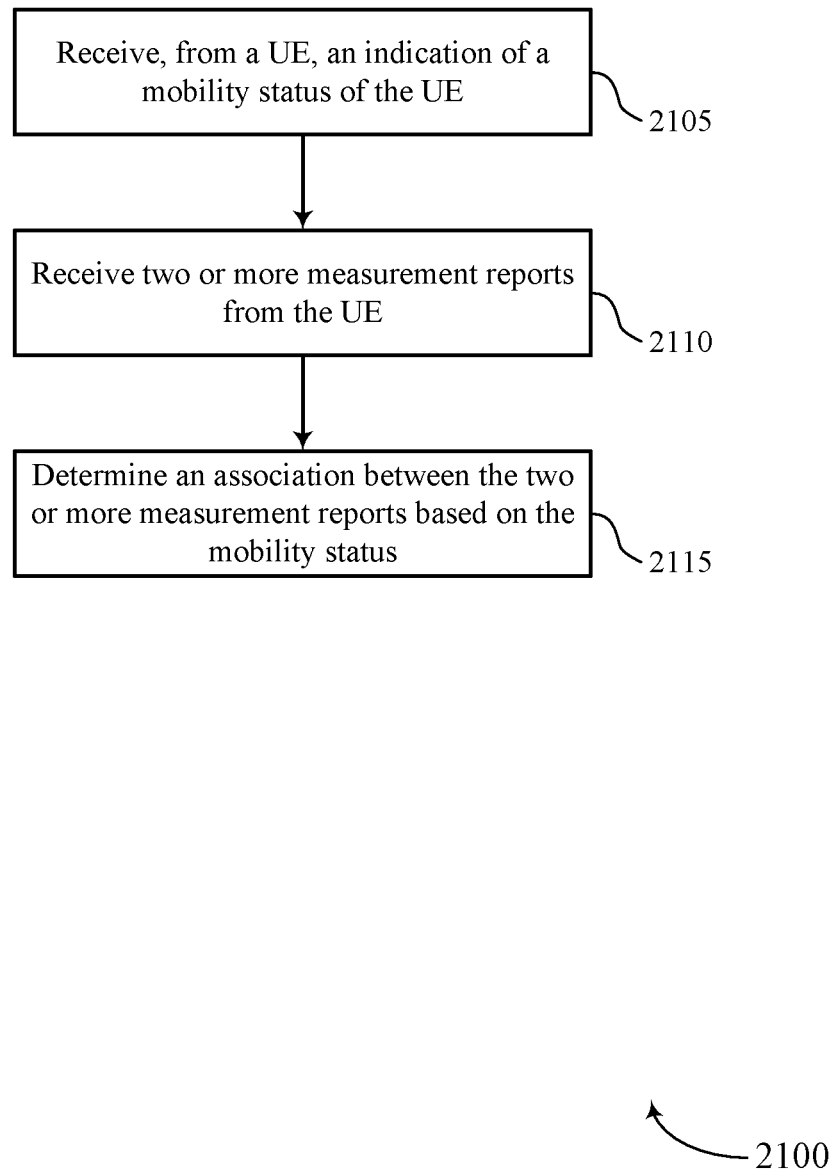

FIG. 21 shows a flowchart illustrating a method 2100 that supports bike lane communications networks in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may receive, from a UE, an indication of a mobility status of the UE. The operations of 2105 may be performed according to the methods described herein. In some examples, aspects of the operations of 2105 may be performed by a mobility component as described with reference to FIGS. 14 through 17.

At 2110, the base station may receive two or more measurement reports from the UE. The operations of 2110 may be performed according to the methods described herein. In some examples, aspects of the operations of 2110 may be performed by a measurement manager as described with reference to FIGS. 14 through 17.

At 2115, the base station may determine an association between the two or more measurement reports based on the mobility status. The operations of 2115 may be performed according to the methods described herein. In some examples, aspects of the operations of 2115 may be performed by a measurement manager as described with reference to FIGS. 14 through 17.

Figure 22:
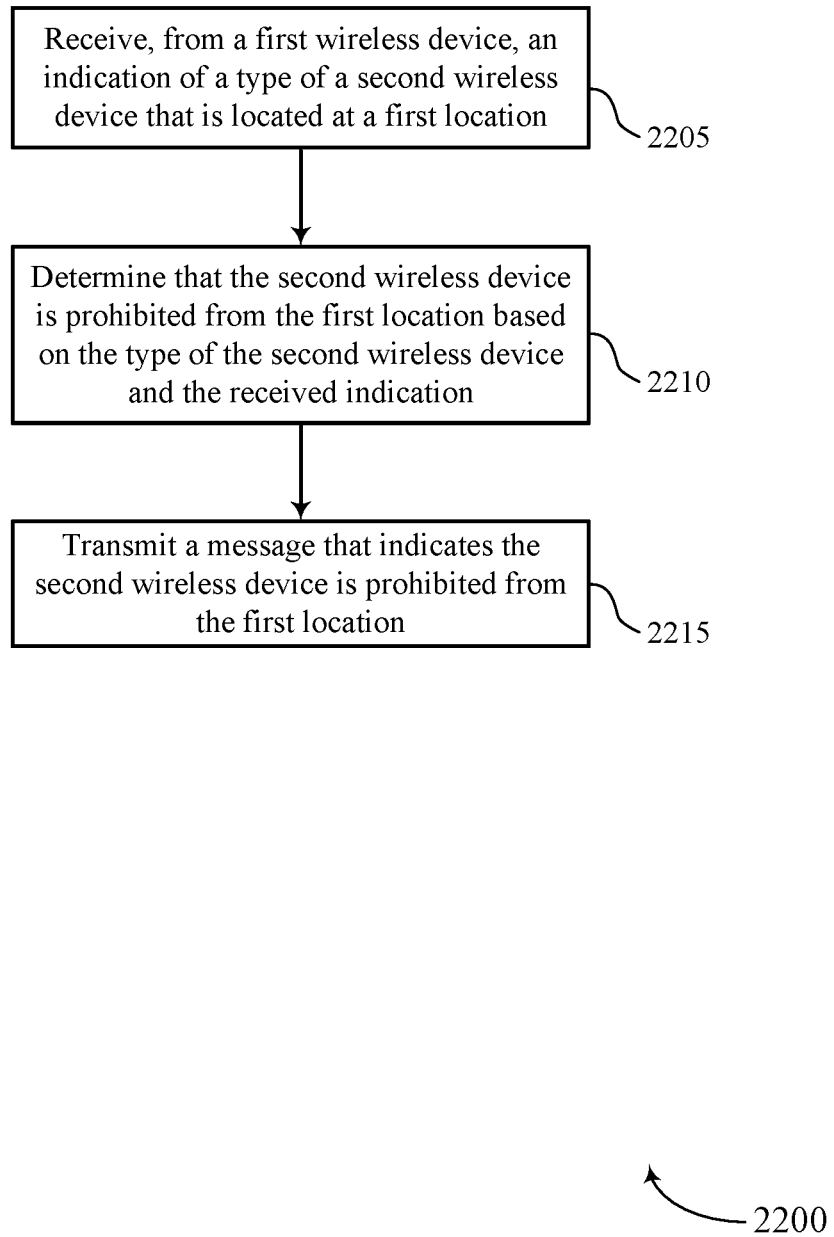

FIG. 22 shows a flowchart illustrating a method 2200 that supports bike lane communications networks in accordance with aspects of the present disclosure. The operations of method 2200 may be implemented by a base station 105 or its components as described herein. For example, the operations of method 2200 may be performed by a base station communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2205, the base station may receive, from a first wireless device, an indication of a type of a second wireless device that is located at a first location. The operations of 2205 may be performed according to the methods described herein. In some examples, aspects of the operations of 2205 may be performed by a mobility component as described with reference to FIGS. 14 through 17.

At 2210, the base station may determine that the second wireless device is prohibited from the first location based on the type of the second wireless device and the received indication. The operations of 2210 may be performed according to the methods described herein. In some examples, aspects of the operations of 2210 may be performed by a mobility component as described with reference to FIGS. 14 through 17.

At 2215, the base station may transmit a message that indicates the second wireless device is prohibited from the first location. The operations of 2215 may be performed according to the methods described herein. In some examples, aspects of the operations of 2215 may be performed by a mobility component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
    identifying, by the wireless device traveling along a route, a plurality of beacon devices located at different geographic positions along the route;
    receiving, by the wireless device over a sidelink communications link, one or more messages from each beacon device of the plurality of beacon devices, wherein each of the one or more messages comprises a beacon device identifier indicating a geographic position of a respective beacon device of the plurality of beacon devices; and
    calculating, by the wireless device, a mobility state of the wireless device using an observed time difference of arrival or a reference signal time difference and based at least in part on the received one or more messages and respective geographic positions of the plurality of beacon devices, the mobility state comprising a geographic location of the wireless device, a speed of the wireless device, or a combination thereof.

2. The method of claim 1, wherein each beacon device identifier corresponds to the respective beacon device of the plurality of beacon devices that transmitted a message of the one or more messages.

3. The method of claim 1, further comprising:
    receiving public safety information within a payload of a first message of the one or more messages; and
    identifying a public safety warning type indicated by the public safety information.

4. The method of claim 3, further comprising:
    prioritizing the first message over other messages received at the wireless device based at least in part on the public safety information within the payload of the first message.

5. The method of claim 4, wherein prioritizing the first message comprises:
    refraining from transmitting to other wireless devices based at least in part on the public safety information; and
    discarding a set of messages received by the wireless device.

6. The method of claim 1, further comprising:
    receiving a second message from a second wireless device, a payload of the second message comprising public safety information, navigation information, hazard information, or a combination thereof; and
    transmitting a third message to one or more other wireless devices based at least in part on the received one or more messages, the received second message, or a combination thereof.

7. The method of claim 6, wherein transmitting the third message comprises:
    transmitting the third message using a first set of time and frequency resources, a payload of the third message comprising an indication of the public safety information.

8. The method of claim 6, wherein transmitting the third message comprises:
    transmitting the third message using a second set of time and frequency resources, a payload of the third message comprising an indication of the navigation information, the hazard information, or a combination thereof.

9. The method of claim 6, wherein a payload of the third message comprises an indication of the public safety information, the navigation information, the hazard information, location information, or a combination thereof.

10. The method of claim 1, further comprising:
    receiving an indication of an emergency event; and
    communicating with one or more temporary nodes based at least in part on the received indication, wherein the one or more temporary nodes form a mobile hotspot, a mesh network, or any combination thereof.

11. The method of claim 1, further comprising:
    determining a mobility status of the wireless device based at least in part on the received one or more messages; and
    transmitting, to a base station, an indication of the mobility status, wherein the mobility status comprises a cyclist status.

12. The method of claim 1, wherein receiving the one or more messages comprises:
    receiving the one or more messages via an unlicensed radio frequency spectrum band over the sidelink communications link.

13. The method of claim 1, wherein receiving the one or more messages comprises:
    receiving the one or more messages via a licensed radio frequency spectrum band over the sidelink communications link, wherein each of the one or more messages are received on a set of configured resources, a set of predefined resources, or a combination thereof.

14. The method of claim 1, wherein the wireless device comprises a user equipment, an on board module of a bicycle, or any combination thereof, and wherein each beacon device of the plurality of beacon devices comprise a road side beacon for a bike lane.

15. A method for wireless communication at a beacon device, comprising:
    generating a beacon device identifier based at least in part on a geographic location of the beacon device and based at least in part on a time at which one or more messages are to be transmitted by the beacon device;
identifying one or more other wireless devices; and
transmitting, over a sidelink communications link, the one or more messages to the one or more other wireless devices, each of the one or more messages including the beacon device identifier, wherein the beacon device identifier is associated with determining a mobility state comprising a location, a speed, or a combination thereof.

16. The method of claim 15, further comprising:
identifying a public safety warning type associated with an event; and
transmitting, within a payload of each of the one or more messages, public safety information indicating the public safety warning type.

17. The method of claim 16, further comprising:
receiving an indication to transmit the public safety information within the payload, wherein the indication is triggered in accordance with a network configuration, or via a user input, or a combination thereof.

18. The method of claim 15, wherein a payload of a first message of the one or more messages comprises an indication of public safety information, navigation information, hazard information, or a combination thereof.

19. The method of claim 15, wherein transmitting the one or more messages comprises:
performing a clear channel assessment for an unlicensed radio frequency spectrum band;
determining whether the unlicensed radio frequency spectrum band is available based at least in part on the clear channel assessment; and
transmitting the one or more messages via the unlicensed radio frequency spectrum band over the sidelink communications link based at least in part on determining that the unlicensed radio frequency spectrum band is available.

20. The method of claim 15, wherein transmitting the one or more messages comprises:
identifying a set of resources within a licensed radio frequency spectrum band for transmitting the one or more messages; and
transmitting the one or more messages via the set of resources over the sidelink communications link, wherein the set of resources comprise resources scheduled by a base station, predefined resources, or a combination thereof.

21. The method of claim 15, further comprising:
transmitting, to one or more temporary nodes, an emergency signal indicating an event associated with the one or more other wireless devices, wherein the emergency signal comprises location information associated with the event, and wherein the one or more temporary nodes form a mobile hotspot, a mesh network, or any combination thereof.

22. An apparatus for wireless communication at a wireless device, comprising:
one or more processors,
one or more memories coupled with the one or more processors;
a transceiver; and
one or more processor-readable instructions stored in the one or more memories and executable by the one or more processors to cause the apparatus to:
identify, by the wireless device traveling along a route, a plurality of beacon devices located at different geographic positions along the route;
receive, by the wireless device via the transceiver over a sidelink communications link, one or more messages from each beacon device of the plurality of beacon devices, wherein each of the one or more messages comprises a beacon device identifier indicating a geographic position of a respective beacon device of the plurality of beacon devices; and
calculate, by the wireless device, a mobility state of the wireless device using an observed time difference of arrival or a reference signal time difference and based at least in part on the received one or more messages and based at least in part on the received one or more messages and respective geographic positions of the plurality of beacon devices, the mobility state comprising a geographic location of the wireless device, a speed of the wireless device, or a combination thereof.

23. The method of claim 1, wherein calculating the mobility state comprises:
calculating, via one or more equations, the speed of the wireless device, a location of the wireless device along the route, or both, based at least in part on the received one or more messages and based at least in part on the respective geographic positions along the route of the plurality of beacon devices indicated by the beacon device identifier, wherein the mobility state comprises the speed, the location, or both.

24. The apparatus of claim 22, wherein, to calculate the mobility state, the one or more processors are operable to execute the one or more instructions to cause the apparatus to:
calculating, via one or more equations, the speed of the wireless device, a location of the wireless device along the route, or both, based at least in part on the received one or more messages and based at least in part on the respective geographic positions along the route of the plurality of beacon devices indicated by the beacon device identifier, wherein the mobility state comprises the speed, the location, or both.

25. The method of claim 1, wherein receiving the one or more messages comprises:
receiving the one or more messages via a first set of time and frequency resources or via a second set of time and frequency resources based at least in part on a type of information included in a payload of the one or more messages, wherein the first set of time and frequency resources are associated with a first type of information and the second set of time and frequency resources are associated with a second type of information.

26. The method of claim 25, wherein the first type of information is associated with public safety information, and wherein the second type of information is associated with navigation information, hazard information, or both.

27. The method of claim 15, wherein transmitting the one or more messages comprises:
transmitting the one or more messages via a first set of time and frequency resources or via a second set of time and frequency resources based at least in part on a type of information included in a payload of the one or more messages, wherein the first set of time and frequency resources are associated with a first type of information and the second set of time and frequency resources are associated with a second type of information.

28. The method of claim 27, wherein the first type of information is associated with public safety information, and wherein the second type of information is associated with navigation information, hazard information, or both.

29. The apparatus of claim 22, wherein, to receive the one or more messages, the one or more processors are operable to execute the one or more instructions to cause the apparatus to:
receive the one or more messages via a first set of time and frequency resources or via a second set of time and frequency resources based at least in part on a type of information included in a payload of the one or more messages, wherein the first set of time and frequency resources are associated with a first type of information and the second set of time and frequency resources are associated with a second type of information.

30. The apparatus of claim 29, wherein the first type of information is associated with public safety information, and wherein the second type of information is associated with navigation information, hazard information, or both.

* * * * *